US010306838B2

(12) United States Patent
Jones et al.

(10) Patent No.: US 10,306,838 B2
(45) Date of Patent: *Jun. 4, 2019

(54) BALE STORAGE SYSTEM WITH DAMPER ASSEMBLY

(71) Applicant: Deere & Company, Moline, IL (US)

(72) Inventors: Austin J. Jones, Ottumwa, IA (US); Henry D. Anstey, Ottumwa, IA (US)

(73) Assignee: DEERE & COMPANY, Moline, IL (US)

(*) Notice: Subject to any disclaimer, the term of this patent is extended or adjusted under 35 U.S.C. 154(b) by 2 days.

This patent is subject to a terminal disclaimer.

(21) Appl. No.: 15/428,105

(22) Filed: Feb. 8, 2017

(65) Prior Publication Data

US 2017/0290269 A1 Oct. 12, 2017

Related U.S. Application Data

(60) Provisional application No. 62/320,251, filed on Apr. 8, 2016.

(51) Int. Cl.
*A01D 90/10* (2006.01)
*A01D 85/00* (2006.01)
*A01F 15/08* (2006.01)

(52) U.S. Cl.
CPC ........... *A01D 90/10* (2013.01); *A01D 85/005* (2013.01); *A01F 15/0883* (2013.01); *A01D 2085/007* (2013.01); *A01D 2085/008* (2013.01)

(58) Field of Classification Search
CPC .... A01D 85/005; A01D 85/00; A01D 90/083; A01D 90/08; A01D 90/10;

(Continued)

(56) References Cited

U.S. PATENT DOCUMENTS 3,163,302 A 12/1964 Pridgeon
4,310,275 A 1/1982 Hoelscher
(Continued)

FOREIGN PATENT DOCUMENTS

AU 568143 12/1987
AU 2003262343 6/2005
(Continued)

OTHER PUBLICATIONS

EP17163892.7 Extended European Search Report dated Sep. 4, 2017 (7 pages).

(Continued)

*Primary Examiner* — Robert E Pezzuto
(74) *Attorney, Agent, or Firm* — Michael Best & Friedrich LLP

(57) ABSTRACT

A bale collection system and method for receiving and storing a bale introduced at a first location and in a first direction, the bale defining an axis therethrough. The bale collection system includes a frame defining at least one storage bay sized to store a bale therein. The bale collection system also includes an arm pivotably coupled to the frame and movable with respect to the frame between a first position and a second position, the arm having a bale contact surface configured to contact a bale at least partially received within the storage bay, and a resistance member in operable engagement with the arm and configured to resist the motion of the arm between the first and second positions.

24 Claims, 25 Drawing Sheets

(58) Field of Classification Search
CPC .............. A01F 15/0883; A01F 15/0765; A01F 15/0875; A01F 15/071
USPC ......... 56/473.5, 474, 476; 53/118, 211, 588; 100/15, 88; 414/24.5, 111, 470
See application file for complete search history.

(56) References Cited

U.S. PATENT DOCUMENTS

| | | | |
|---|---|---|---|
| 4,789,289 A * | 12/1988 | Wilson | A01D 87/127 241/101.76 |
| 4,844,675 A * | 7/1989 | Strosser | A01D 85/005 280/656 |
| 4,952,111 A | 8/1990 | Callahan | |
| 4,955,774 A | 9/1990 | Van Eecke et al. | |
| 5,180,271 A * | 1/1993 | Farden | A01D 90/083 298/18 |
| 5,263,410 A | 11/1993 | Olin | |
| 5,384,436 A | 1/1995 | Pritchard | |
| 5,560,191 A | 10/1996 | Finney et al. | |
| 5,564,923 A | 10/1996 | Grassi et al. | |
| 5,842,823 A | 12/1998 | Kohnen et al. | |
| 6,053,685 A | 4/2000 | Tomchak | |
| 6,240,712 B1 * | 6/2001 | Meijer | A01D 85/005 100/88 |
| 6,425,235 B1 * | 7/2002 | Spaniol | A01D 85/005 56/474 |
| 6,807,901 B2 | 10/2004 | Bentzinger et al. | |
| 7,000,533 B2 | 2/2006 | Derscheid et al. | |
| 7,401,547 B2 | 7/2008 | Degen | |
| 8,522,513 B2 | 9/2013 | Reijersen Van Buuren | |
| 9,622,420 B2 * | 4/2017 | Kraus | A01F 15/0883 |
| 2006/0086263 A1 | 4/2006 | Degen | |
| 2008/0141870 A1 | 6/2008 | Verhaeghe et al. | |
| 2014/0144119 A1 * | 5/2014 | Olander | A01F 15/0705 56/341 |
| 2016/0014966 A1 | 1/2016 | Kraus et al. | |
| 2016/0014967 A1 | 1/2016 | Kraus et al. | |
| 2016/0014968 A1 | 1/2016 | Kraus et al. | |
| 2016/0014969 A1 | 1/2016 | Kraus et al. | |
| 2016/0014970 A1 | 1/2016 | Kraus et al. | |
| 2016/0014971 A1 | 1/2016 | Kraus | |

FOREIGN PATENT DOCUMENTS

| | | |
|---|---|---|
| CA | 2709397 | 5/2000 |
| DE | 2851117 | 6/1980 |
| DE | 3347220 | 9/1985 |
| DE | 102006051622 | 5/2008 |
| EP | 983720 | 3/2000 |
| EP | 2870856 | 5/2015 |
| EP | 2923560 | 9/2015 |
| FR | 2679410 | 1/1993 |
| FR | 2679732 | 2/1993 |
| GB | 2106830 | 4/1983 |
| GB | 2204826 | 11/1988 |
| GB | 2297944 | 8/1996 |
| JP | 2003143927 | 5/2003 |
| PL | 158422 | 9/1992 |
| WO | 2014031355 | 2/2014 |

OTHER PUBLICATIONS

EP17164283.8 Extended European Search Report dated Sep. 4, 2017 (7 pages).

* cited by examiner

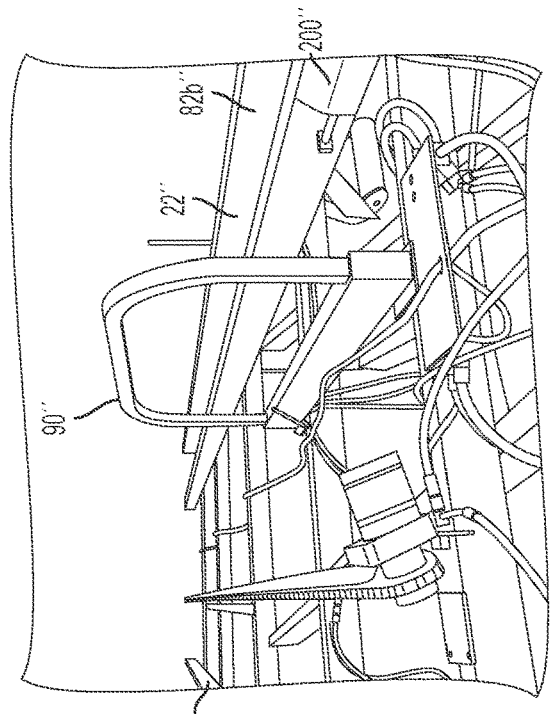
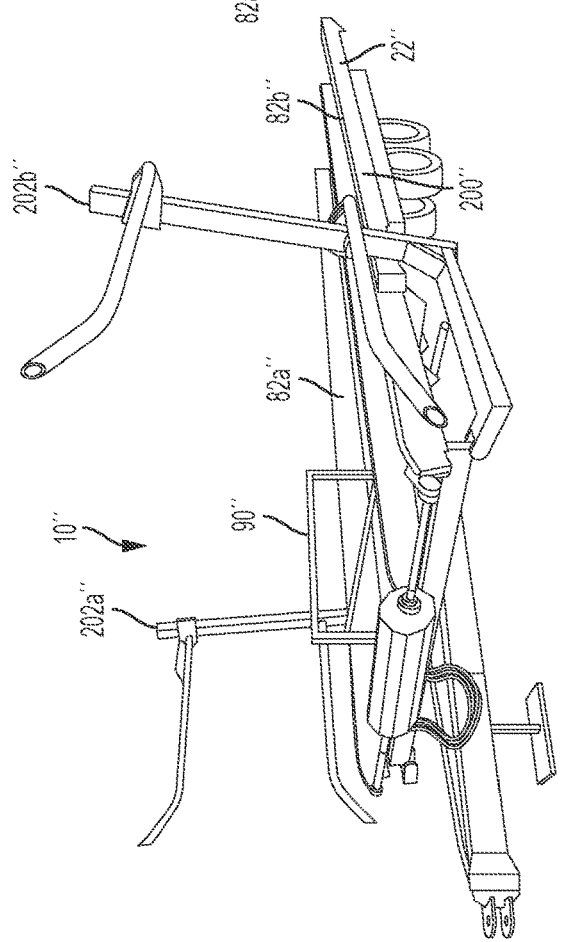

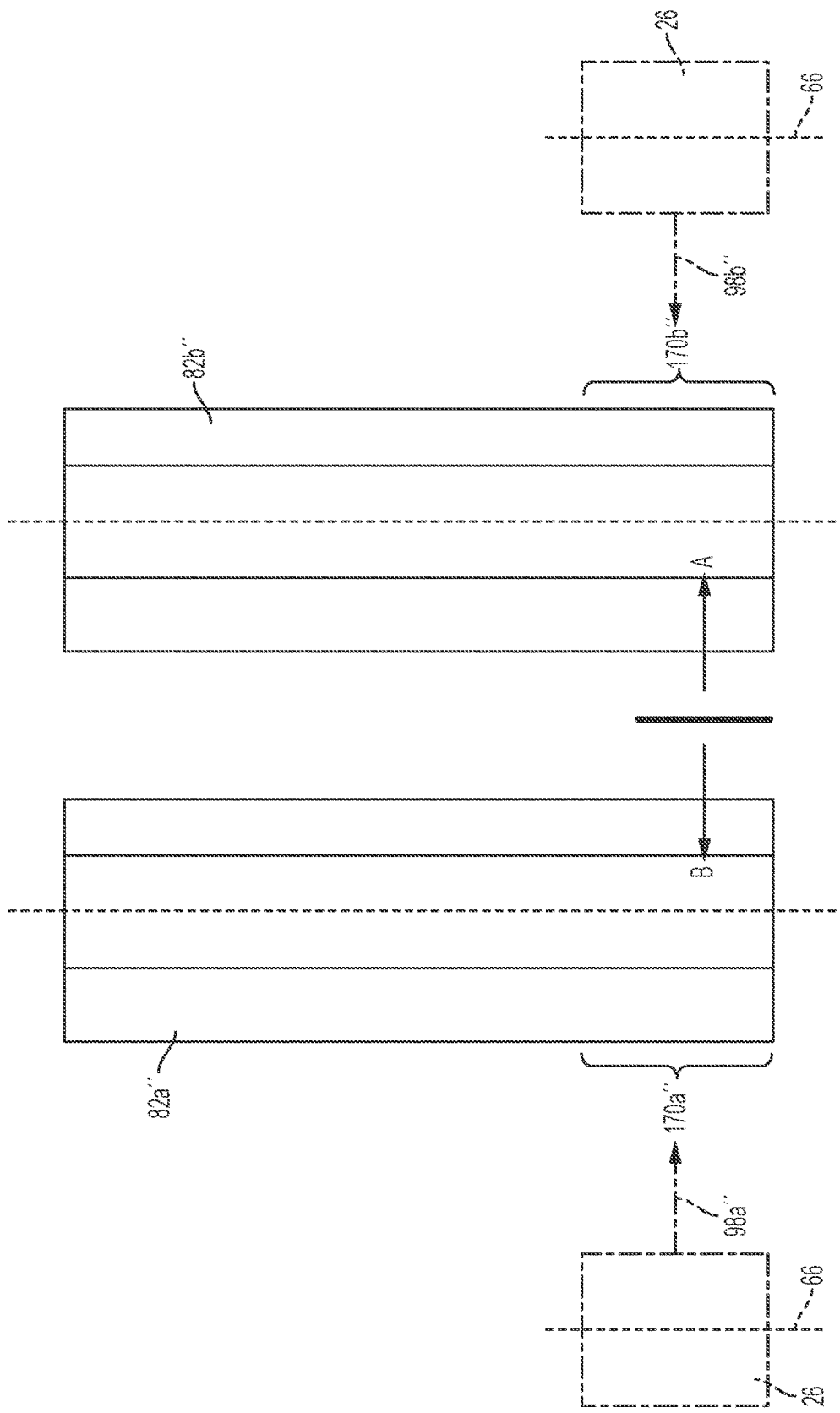

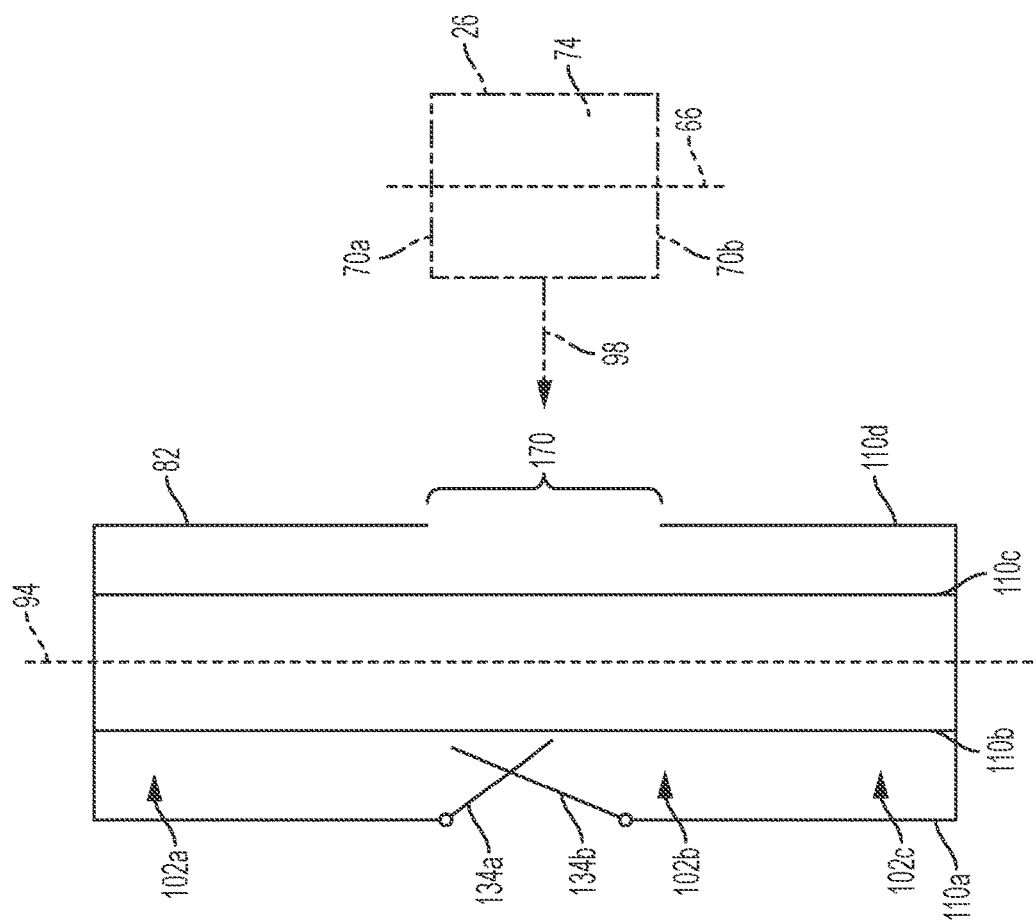

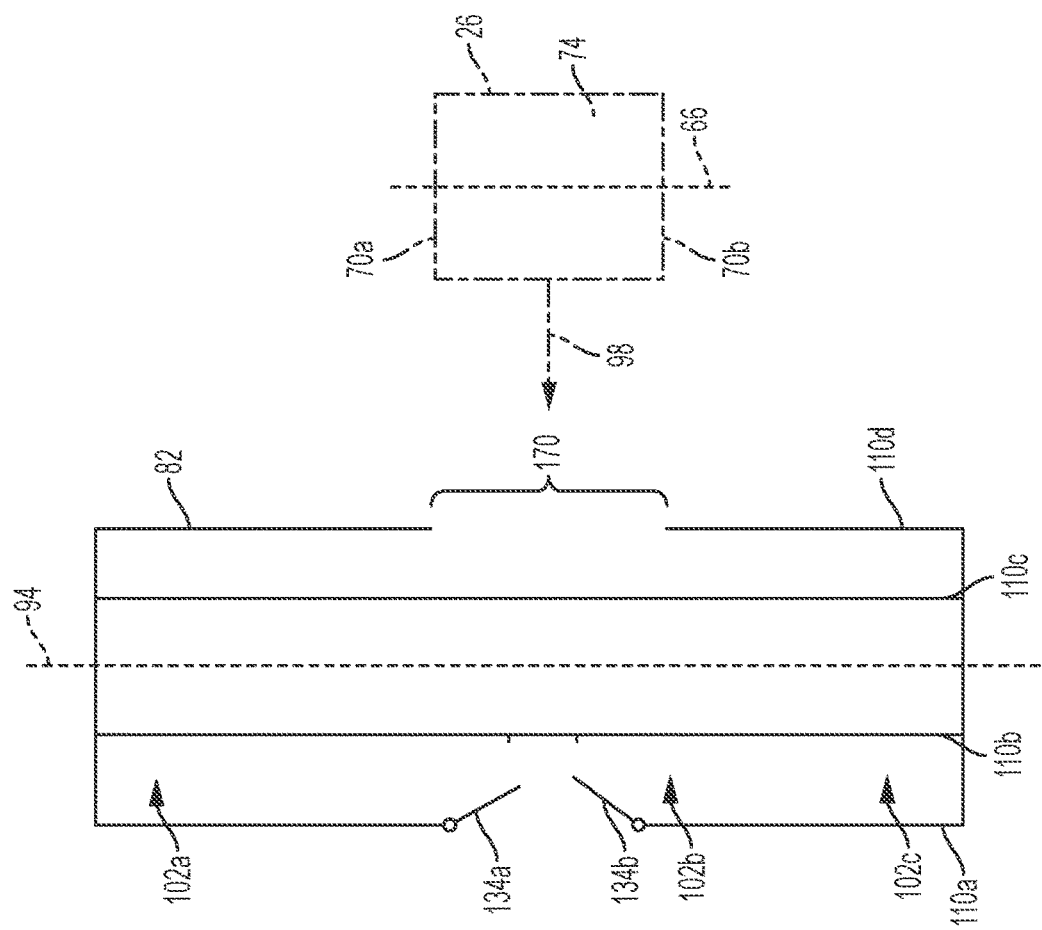

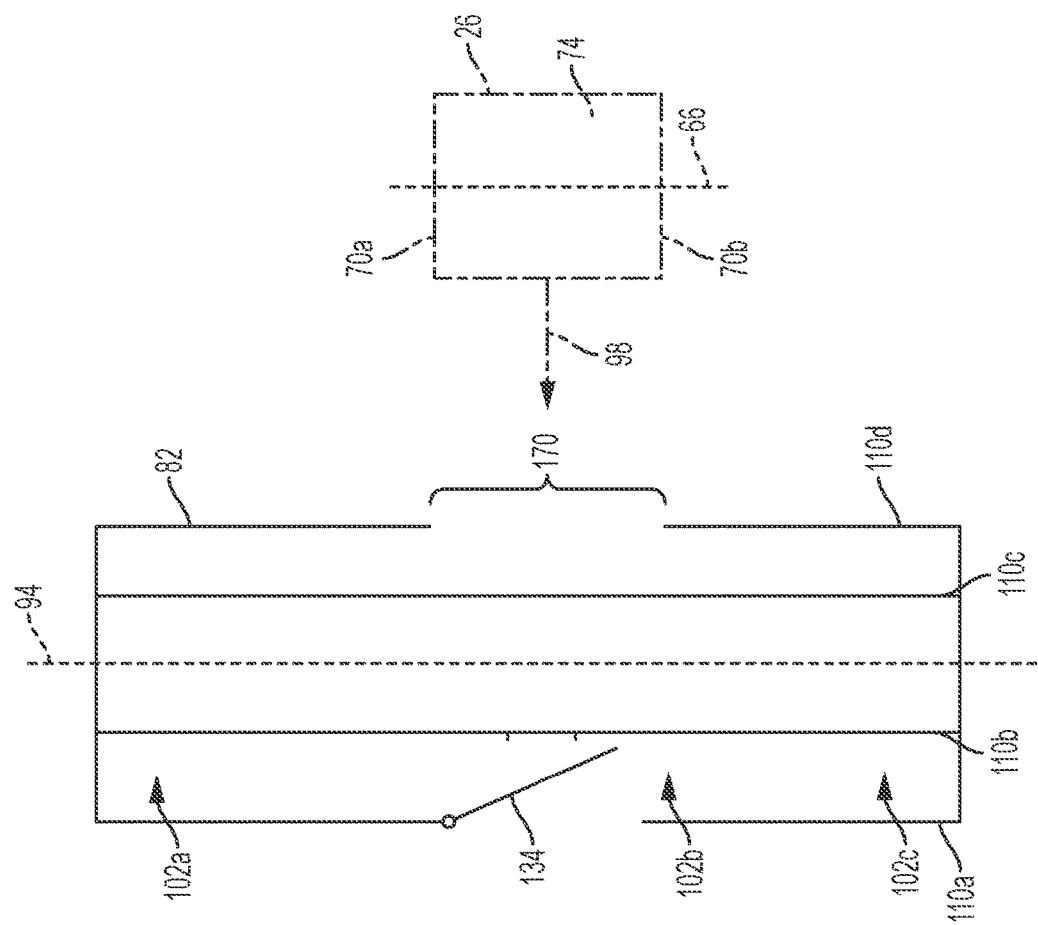

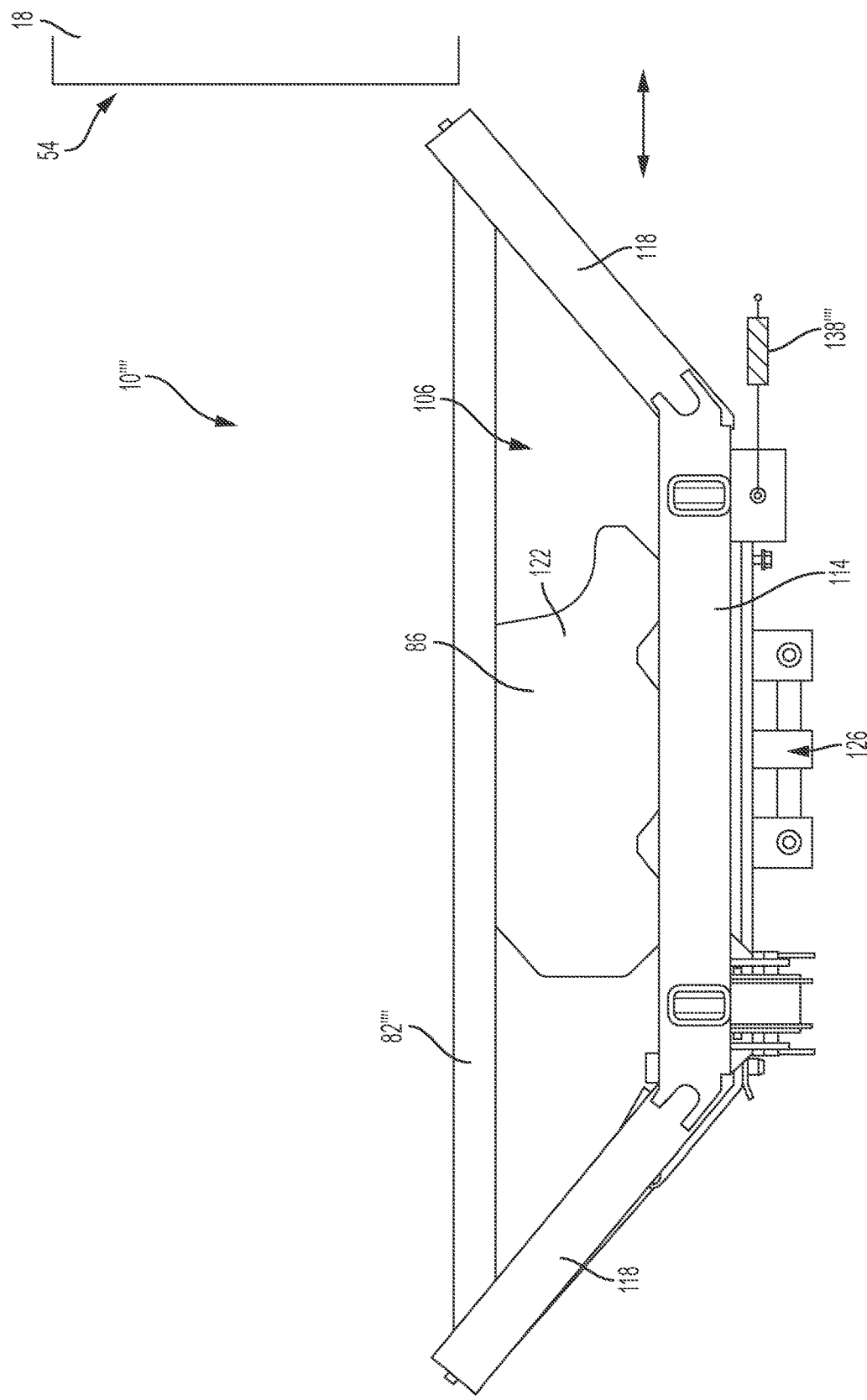

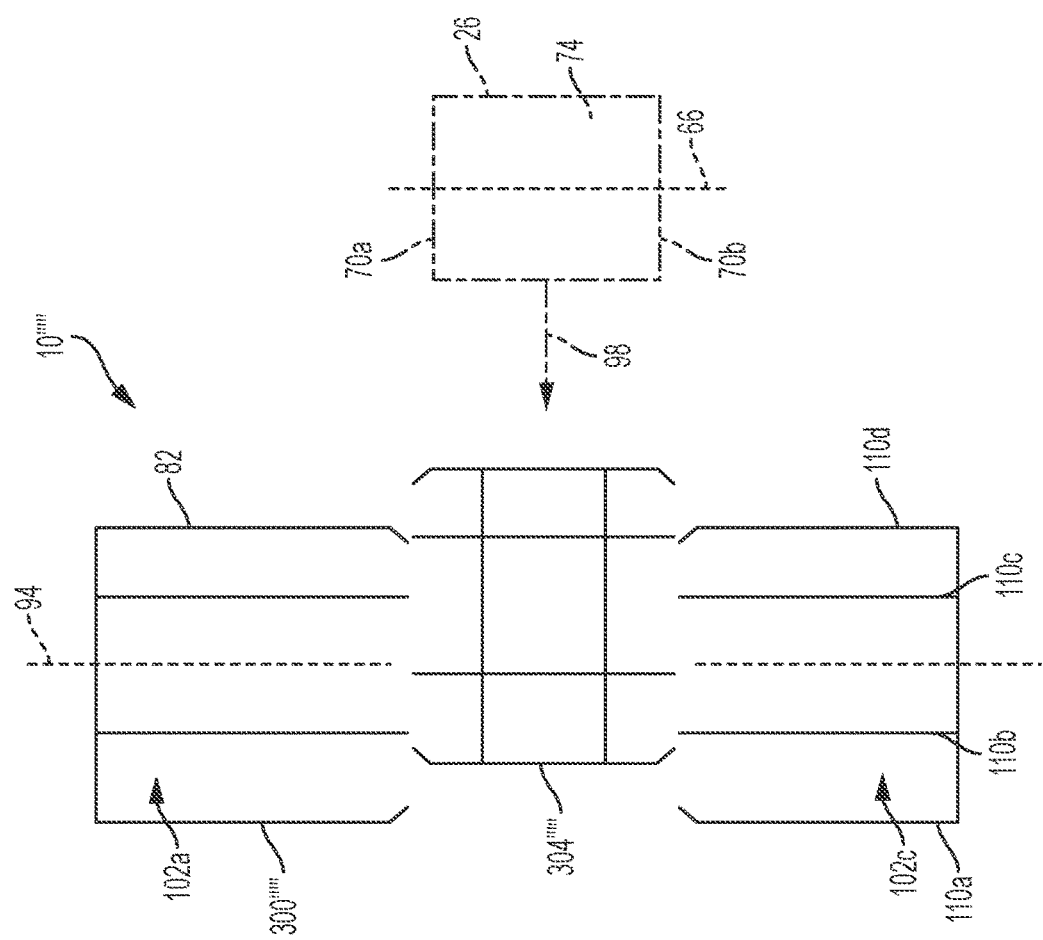

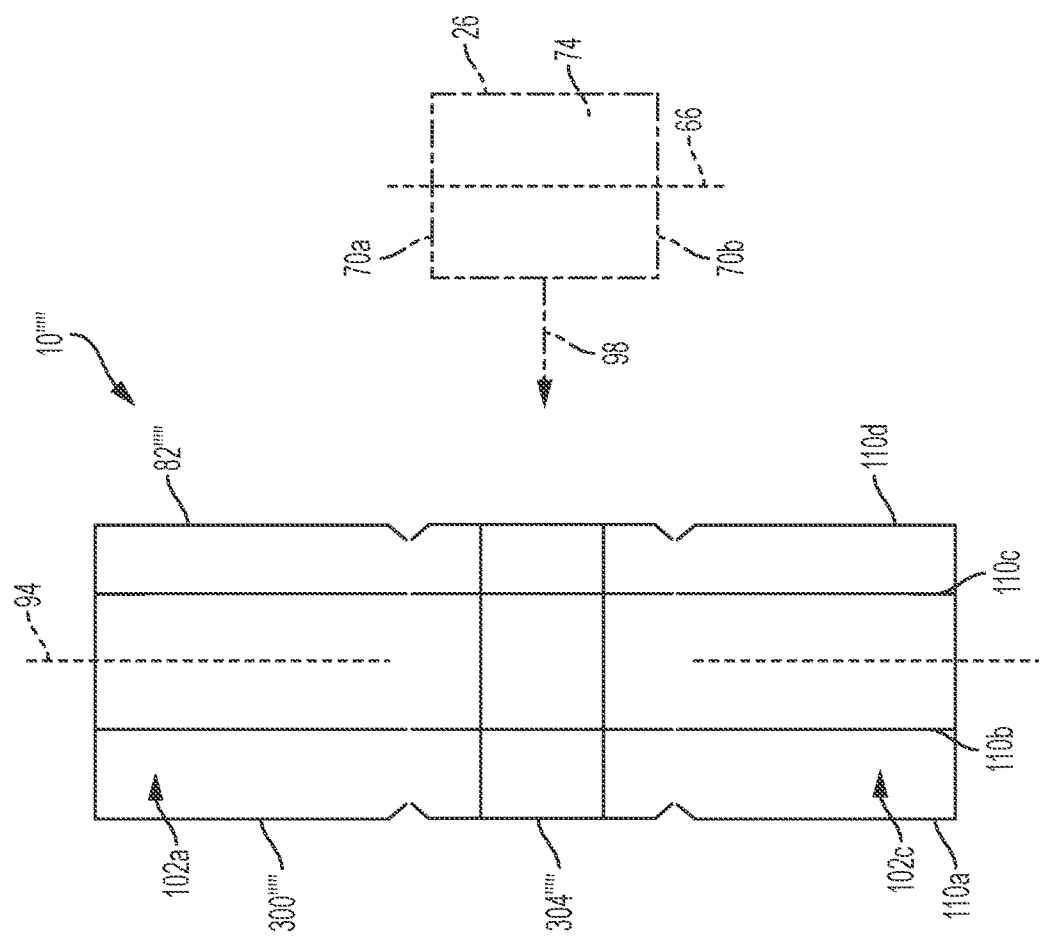

US 10,306,838 B2

BALE STORAGE SYSTEM WITH DAMPER ASSEMBLY

CROSS-REFERENCE TO RELATED APPLICATIONS

This application claims priority to U.S. Provisional Patent Application No. 62/320,251, filed Apr. 8, 2016, the content of which is incorporated herein by reference.

BACKGROUND

The present disclosure relates to bale storage systems and methods, and more specifically to bale storage systems and methods in which a damper assembly is configured to dissipate the kinetic energy of a bale.

During the baling process, large cylindrical bales are rolled or otherwise placed onto various storage devices, such as accumulators, trailers, and the like. During this process, the bale's rolling motion generates a large amount of kinetic (e.g., rotational and translational) energy that must be contained in order to properly position the bale within the storage device. When attempting to contain the bale's energy, large impact forces are generated by the bale when it comes into contact with fixed-fences and other stops, which often results in large recoil oscillations (i.e., bouncing off the fence or rocking back and forth in the storage device) or damage to the device itself from excess stress being placed on the mechanism.

SUMMARY

In one aspect, the disclosure provides a bale collection system for receiving and storing a bale introduced at a first location and in a first direction, the bale defining an axis therethrough, and the bale collection system including a frame defining at least one storage bay sized to store a bale therein. The bale collection system also includes an arm movable between a first position and a second position, the arm having a bale contact surface configured to contact a bale at least partially received within the storage bay, and a resistance member in operable engagement with the arm and configured to resist motion of the arm between the first and second positions.

In another aspect, the disclosure provides a bale collection system for receiving and storing a bale, the collection system including a plurality of rail members defining a trough having a central axis therethrough, the central axis parallel to each rail member of the plurality of rail members. The bale collection system also includes a damping system coupled to at least one of the rail members and configured to engage a bale at least partially received into the trough, the damping system having an arm movable with respect to the trough in a direction perpendicular to the central axis between a first position and a second position, and a resistance member coupled to the arm and configured to resist movement of the arm between the first position and the second position.

In yet another aspect, the disclosure provides an accumulator configured for coupling to a baler, the accumulator including a frame defining a storage bay sized to receive at least a portion of a bale from the baler, and a damping system. Where the damping system includes a member coupled to and movable with respect to the frame, the member presenting a bale contact surface, where the member is configured to move with respect to the frame upon the introduction of at least a portion of a bale into the storage bay, and a damping assembly operatively positioned between the member and the frame, the damping assembly configured to resist the movement of the member with respect to the frame.

In yet another aspect, a bale collection system for receiving and storing a bale, the bale collection system including a baler having a rear aperture through which a completed bale is ejected, a crop package barrier coupled to the baler proximate the rear aperture and movable with respect to the crop package barrier between an open position and a closed position, and a dampening system coupled to the door. Where the dampening system includes a member coupled to and movable with respect to the crop package barrier, the member presenting a bale contact surface, and where the member is configured to move with respect to the crop package barrier upon the ejection of a bale from the rear aperture, and a resistance member operatively coupled to the member and configured to resist the movement of the member with respect to the crop package barrier.

Other aspects of the disclosure will become apparent by consideration of the detailed description and accompanying drawings.

BRIEF DESCRIPTION OF THE DRAWINGS

FIGS. 10a-10b illustrate another alternative implementation of a bale collector system.

FIG. 11 is a schematic view of the bale collector system of FIGS. 10a and 10b.

FIGS. 16a-16c are schematic top views of other implementations of the accumulator of the bale system.

FIGS. 18a-18b illustrate side views of another implementation of the accumulator of the bale system.

FIGS. 19a-19b are schematic top views of another implementation of the accumulator of the bale system.

DETAILED DESCRIPTION

Before any embodiments of the disclosure are explained in detail, it is to be understood that the disclosure is not limited in its application to the details of the formation and arrangement of components set forth in the following description or illustrated in the accompanying drawings. The disclosure is capable of supporting other implementations and of being practiced or of being carried out in various ways.

The disclosure relates to bale collection systems and methods, and more particularly to bale collection systems and methods in which provision is made to damp the motion of each bale as it is loaded into and positioned within the system. In particular, a damping mechanism is used to dissipate the kinetic energy of the bale (e.g., brought about by the rotation and translational movement of the bale) as it rolls into place in the system so that it can be subsequently processed by the system. By dissipating the energy of the bale, the bale can be loaded into position quickly, allowing the system to maintain a high level of efficiency, while also minimizing the chances for and amount of damage occurring to the system itself or the bale. Unlike a hard barrier, in which the user must decide between fast bale loading in which recoil oscillations and damage to the device become increasingly hazardous problems, or slow bale loading in which the user must sacrifice efficiency to minimize recoil and damage, the bale collection system of the present disclosure permits both fast loading speeds, little to no recoil oscillations, and minimal wear and tear on the storage device, the bale, and the bale wrap material.

Figure 1:
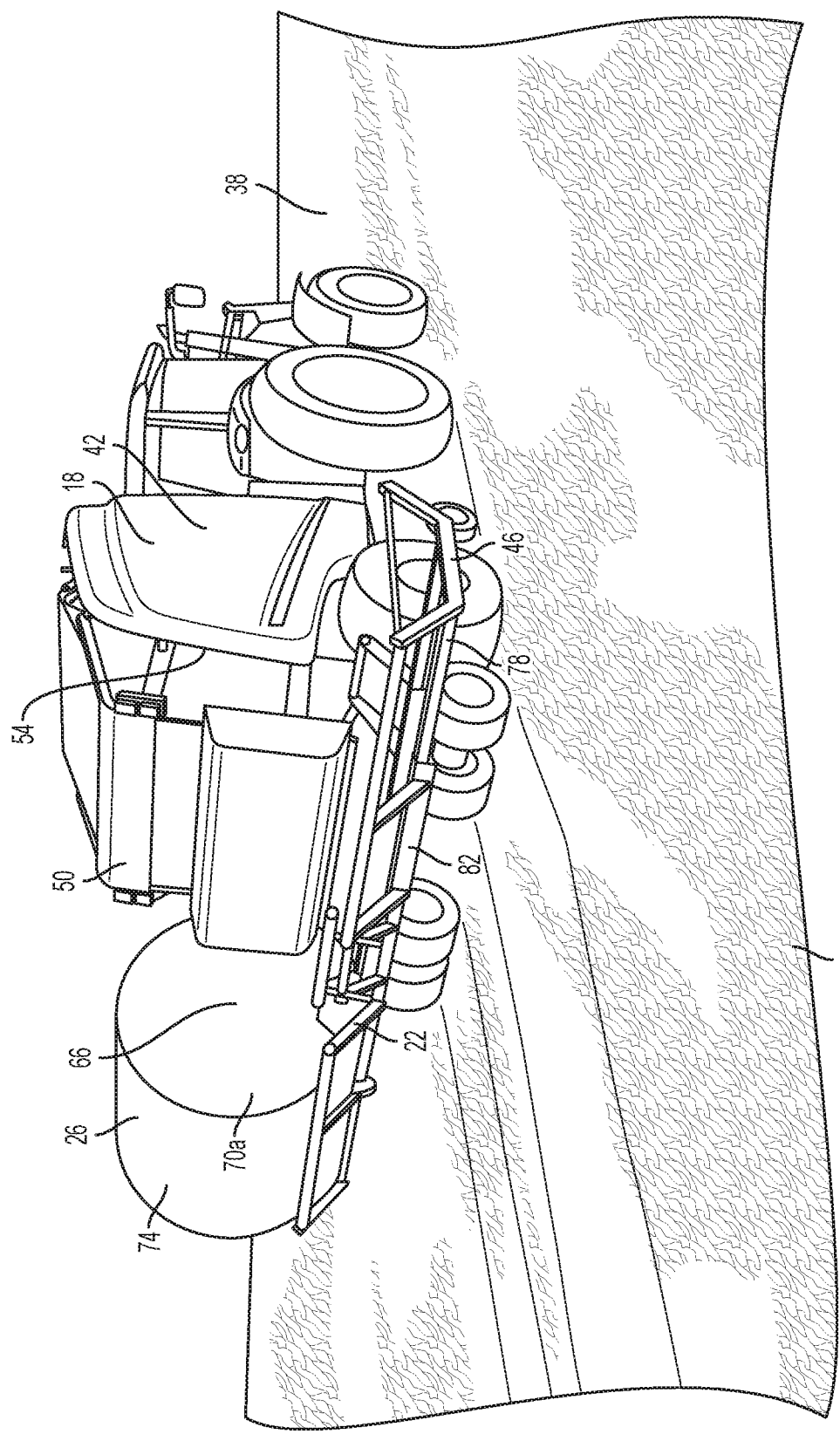
FIG. 1 is a rear perspective view of a bale collection system, with a baler rear door in a closed position.

Referring to FIG. 1, a bale collection system or accumulator 22 is mounted on a baler 18. The baler 18 is configured to collect crop material 34 from the ground's surface 38 (i.e., the field), process the crop material 34 into individual bales 26, then eject the completed bale 26 from the baler 18 for subsequent processing by the accumulator 22. In the illustrated implementation, the baler 18 includes a body 42, a set of wheels 46 mounted on the body 42, and a rear door or crop package barrier 50 pivotably coupled to the body 42 proximate a rear aperture 54. During use, the baler 18 is configured to produce generally cylindrical crop packages, e.g., round bales, from an agricultural field. The baler 18 may produce crop packages from hay, corn stalks, and the like. In some implementations, the baler 18 may also include a loading assembly or transfer system to help convey the bale 26 between the rear aperture 54 and the accumulator 22.

The crop package barrier 50 is pivotable with respect to the body 42 between a closed position, and an open position by gate actuator 44 (e.g., hydraulic actuators, electrical actuators, and the like). The closed position is configured to allow for the formation of a bale 26 within the baler 18. For example, the barrier 50 is in the closed position when the barrier 50 substantially abuts or interfaces with the rear aperture 54 of the baler 18. In contrast, the open position is configured to permit exiting of the bale 26 from the baler 18. More specifically, the completed bale 26 is ejected from the rear aperture 54 of the baler 18 in a direction generally opposite the direction of travel 62. Moreover, the open position of the barrier 50 may vary for different sized bales. In further implementations, the crop package barrier 50 may translate or slide between the closed and open positions. In still further implementations, the crop package barrier 50 may be a skeleton structure that pivots within the baler 18.

In the illustrated implementation, the baler 18 is a "round" baler, forming substantially cylindrical bales 26, each defining an axis 66 therethrough (FIG. 1). Each bale 26 is generally between about 900 lbs. and about 4,000 lbs. having substantially planar side surfaces 70a, 70b and an annular outer surface 74 extending therebetween. However, in other embodiments, the bale 26 can have other shapes, including without limitation rectangular and square bales that can be received by the accumulator with an amount of kinetic (e.g., sliding, rolling) energy.

Figure 2:
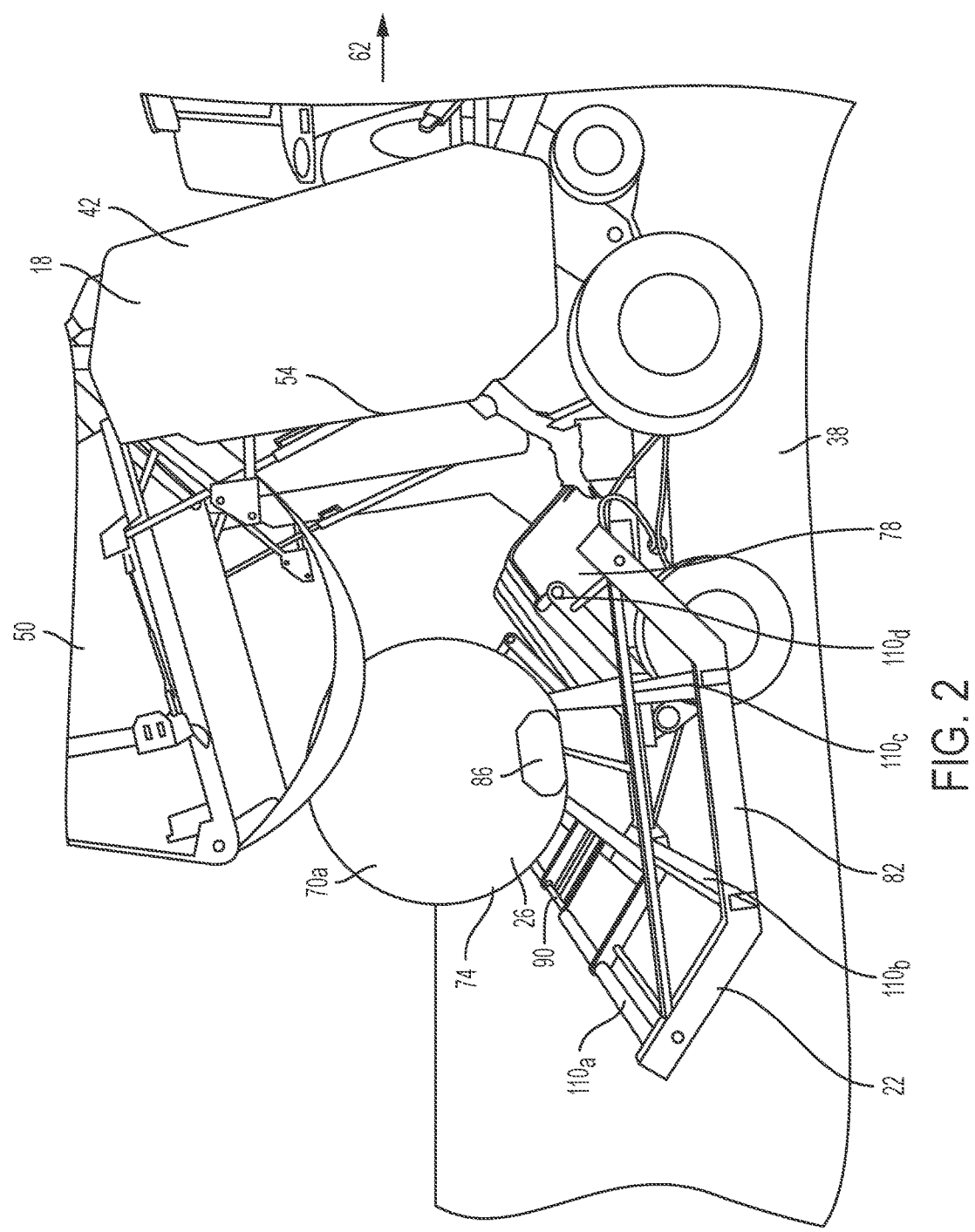
FIG. 2 is a side view of the bale collection system of FIG. 1, with the baler rear door in an open position.

Referring to FIGS. 1 and 2, the accumulator 22 is coupled to the rear of the baler 18, proximate the crop package barrier 50 and is configured to collect and store the completed bales 26 ejected therefrom. The accumulator 22 includes a frame 78 at least partially forming a storage trough 82, a shuttle assembly 86, and a damper assembly 90. In the illustrated implementation, the frame 78 of the accumulator 22 is coupled to and supported by the body 42 and/or a frame of the baler 18, being positioned proximate the crop package barrier 50 and oriented such that a bale 26 ejected from the baler 18 will roll or be slid, along its outer surface 74 and perpendicular its axis 66, into the trough 82.

Figure 3:
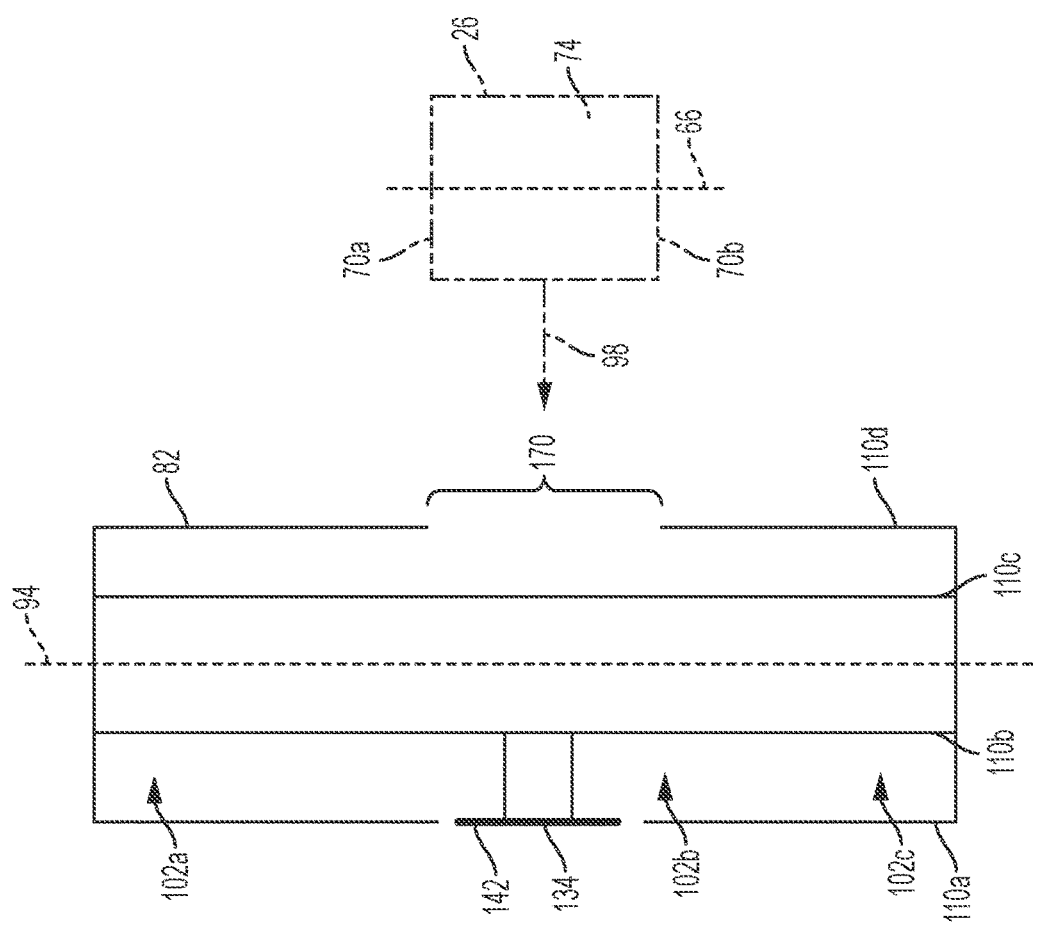
FIG. 3 is a schematic top view of an accumulator of a bale collection system.

Referring also to FIG. 3, the trough 82 of the accumulator 22 is configured to support one or more bales 26 and forms a central axis 94 substantially perpendicular to the direction the bale 26 is ejected (i.e., the insertion direction 98) to form multiple storage bays 102. In the illustrated implementation, the accumulator 22 defines three bays 102a, 102b, 102c, each sized to at least partially receive a bale 26 therein, with the center bay 102b being substantially aligned with the rear aperture 54 of the baler 18 and configured to receive the ejected bale 26 therein. Stated differently, the center bay 102b constitutes the loading zone 170 of the trough 82, which is generally defined as the axial location in which a bale 26 is introduced into the trough 82. In alternative implementations, more or fewer bays 102 may be formed, generally being dictated by the overall width of the trough 82. Still further, the width of the trough 82, and therefore the number of bays 102, may be adjustable in some implementations.

Viewed perpendicularly to the central axis 94, the cross-section of the trough 82 is substantially concave in shape, being formed such that at least a portion of the bale 26 may be positioned within the volume 106 of the trough 82 and held in stable equilibrium (FIG. 2). In the illustrated implementation, the trough 82 is generally formed from four rails 110a, 110b, 110c, 110d, each extending generally parallel to one another and the central axis 94 to form an upwardly-opening trapezoidal shape. With reference also to FIGS. 4-8d, the rails 110a, 110b, 110c, 110d of the trough 82 generally form a bottom or base 114 and two side walls 118 extending upwardly and outwardly from the bottom 114 to form the volume 106 in which at least a portion of the bale 26 is positioned during storage. In addition to securing the bale 26 in the trough 82, the rails 110a, 110b, 110c, 110d also permit the bale 26 to slide laterally on its outer surface 74 between the various bays 102a, 102b, 102c without damaging the outer surface 74.

In other implementations, the trough 82 may include any number of rails (i.e., 3 rails, 5 rails, and the like), be formed by plates, or include other structural elements. Still further, the trough 82 may provide various cross-sectional shapes including a single curved surface (not shown), be "V-shaped" or be substantially planar, so long as the trough 82 can support one or more bales 26 thereon.

Referring to FIGS. 2, 5, 6, and 7, the shuttle assembly 86 of the accumulator 22 is coupled to the frame 78 and configured to slide the bales 26 along the four rails 110a, 110b, 110c, 110d between the various storage bays 102a, 102b, 102c. The shuttle assembly 86 includes a movable paddle 122 positioned at least partially within volume 106 of the trough 82, and a drive assembly 126 to drive the paddle 122 along the central axis 94 of the trough 82. During use, the paddle 122 engages a respective side surface 70a, 70b of the bale 26 and slides the bale 26 parallel to its axis 66 to an adjacent storage bay 102a, 102b, 102c. For example, when a bale 26 enters the accumulator 22 via the insertion direction 98 into the central bay 102b, the paddle 122 engages the side surface 70a and slides the bale 26 into an adjacent bay 102a. To note, the bale 26 is not being rolled between the bays 102, but rather slid along the rails 110 parallel to the bale axis 66. As a result, the central bay 102b is now open and able to receive a subsequent bale 26 therein.

Referring to FIGS. 1-8d, the damper assembly 90 of the accumulator 22 is configured to dissipate the kinetic energy (e.g., the kinetic energy generated by rotational and translational movement of the bale, in the illustrated implementation) of the bale 26 as it enters the trough 82, bringing the bale 26 to a quick and controlled stop. The damper assembly 90 of the illustrated accumulator 22 includes a base 130 coupled to the trough 82, an arm or member 134 pivotably coupled to the base 130, and one or more resistance members or dampers 138 extending between and coupled to both the base 130 and the arm 134.

Figure 4:
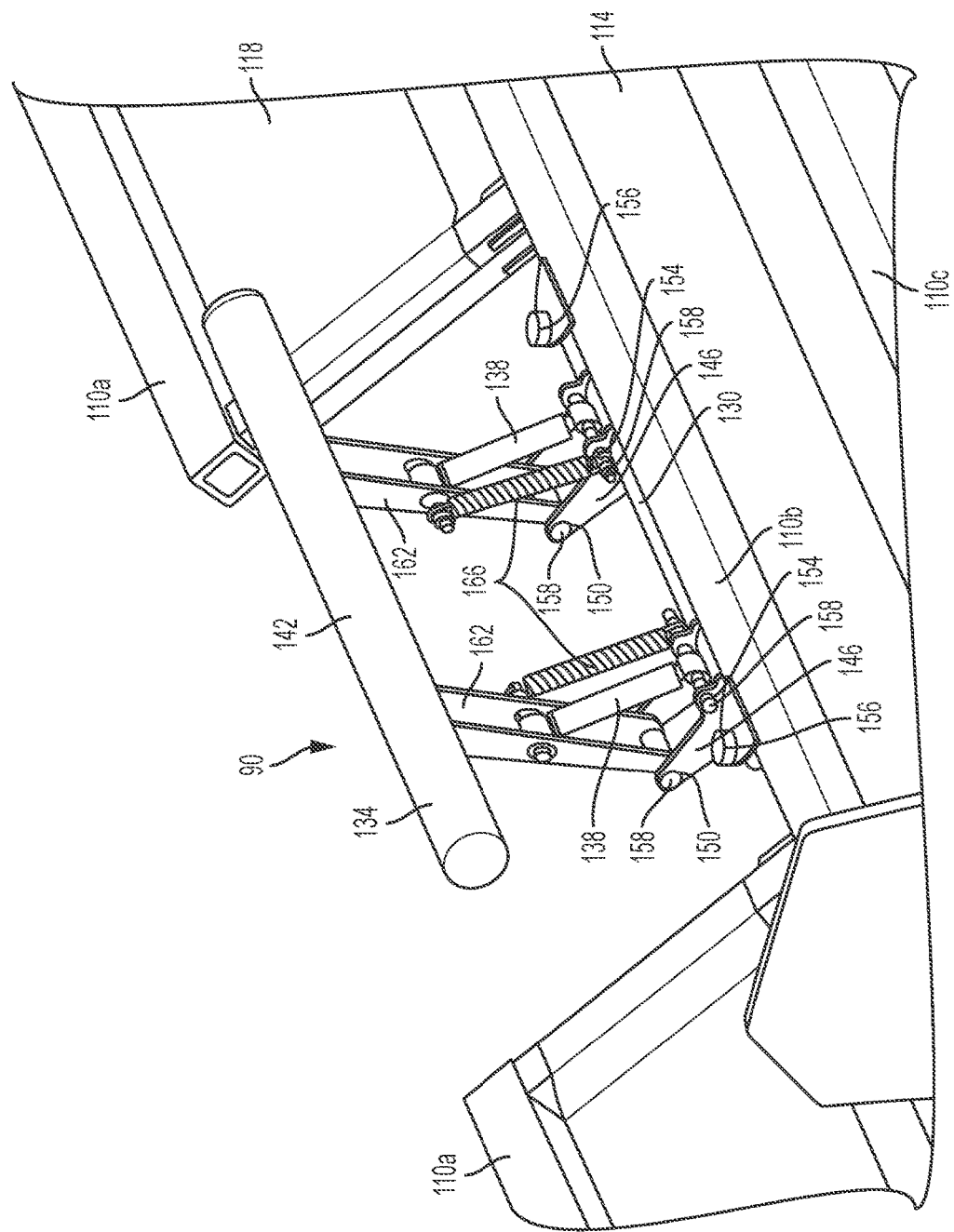
FIG. 4 is a detailed perspective view of a damper assembly of an accumulator, with an arm of the damper assembly in a first position.
Figure 5:
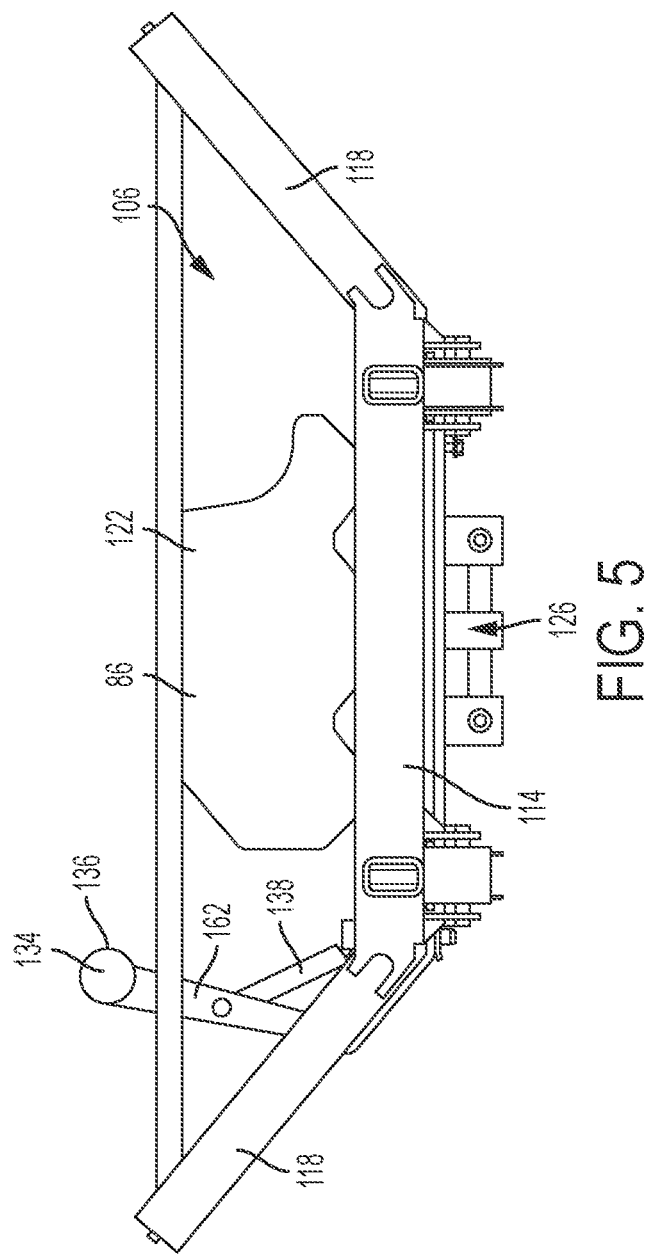
FIG. 5 is an end view of the accumulator of FIG. 4, with the arm of the damper assembly in the first position.
Figure 6:
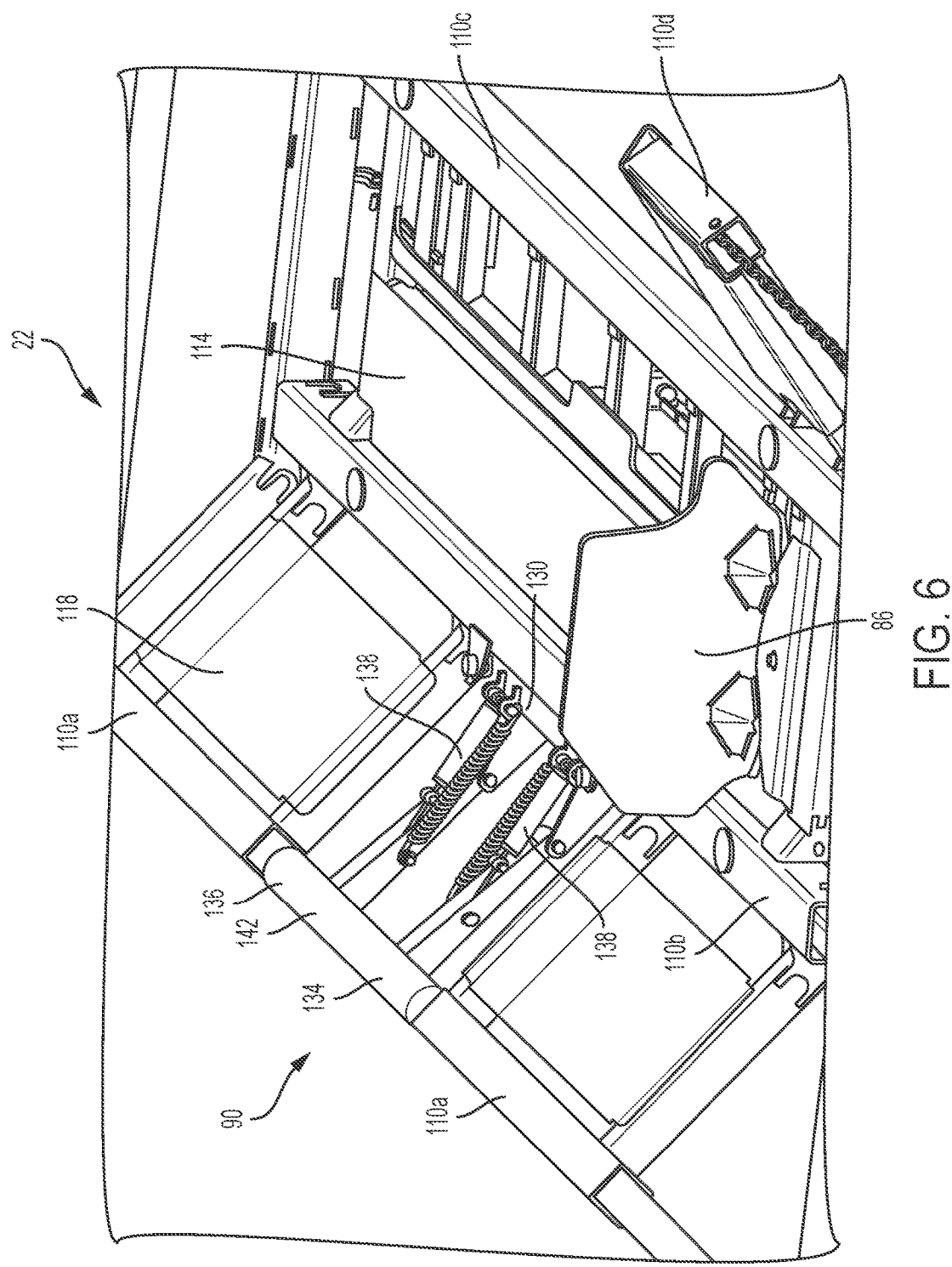
FIG. 6 is a detailed perspective view of the damper assembly of the accumulator of FIG. 4, with the arm of the damper assembly in a second position.
Figure 7:
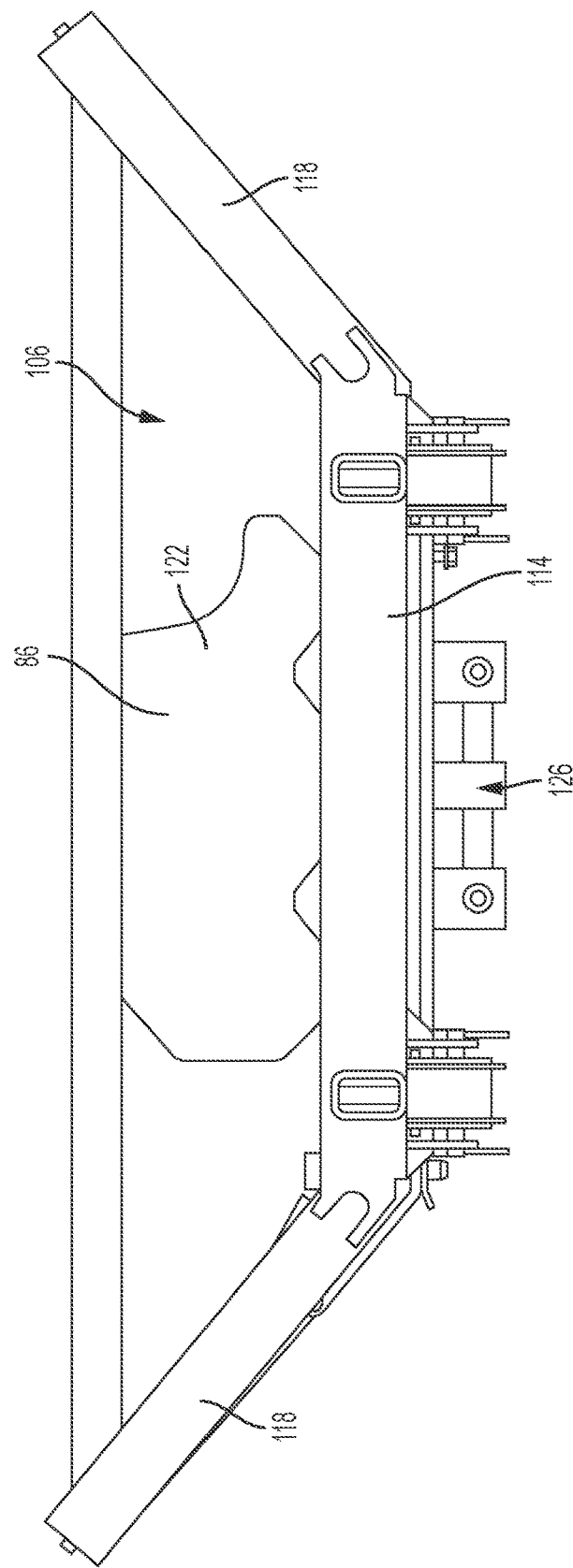
FIG. 7 is an end view of the accumulator of FIG. 6, with the arm of the damper assembly in the second position.

The base 130 of the damper assembly 90 is coupled to the trough 82 of the accumulator 22, and acts as a mounting point for the arm 134 and the one or more resistance members 138. In the illustrated implementation, the base 130 includes a pair of mounting brackets 146 coupled to the rail 110b of the trough 82 via a cross-brace 152, each bracket 146 defining a first mounting aperture 150 and a second mounting aperture 154 (FIG. 4). When the damper assembly 90 is assembled, the first mounting aperture 150 is configured to receive a fastener 158 therethrough to pivotably couple a respective leg 162 of the arm 134 to a respective bracket 146. Furthermore, the second mounting aperture 154 is configured to receive a fastener 158 therethrough to pivotably couple one end of a respective resistance member 138 to a respective bracket 146.

In the illustrated implement, the base 130 of the damper assembly 90 is removably bolted to the rail 110b of the trough 82 by a pair of pins 156 at least partially received within the cross-brace 152. During use, the pins 156 may be removed by the user to allow the damper assembly 90 to be detached from the trough 82 and allow greater access to the trough 82, the net roll access panel 160 (described below), and the like. In alternative implementations, the base 130 may be pivotably coupled to the trough 82 such that removal of the pins 156 will permit the user to pivot the damper assembly 90 into a stowed position to provide greater access to the trough 82, the net roll access panel 160, and the like. In other implementations each individual mounting bracket may be welded or integrally formed with the trough 82. In still other implementations, mounting points for the arm 134 and the resistance member 138 may be formed directly into the rails 110 of the trough 82.

The arm 134 of the illustrated damper assembly 90 includes a cross-bar 142 configured to contact or engage the outer surface 74 of a bale 26, with the aforementioned pair of legs 162 extending from the cross-bar 142 to be pivotably coupled to the base 130.

In the illustrated implementation, the cross-bar 142 of the arm 134 is substantially cylindrical in shape defining a bale contact surface 136 (FIG. 4). However, in alternative implementations, the cross-bar 142 of the arm 134 may include any shape or surface texture to alter the amount of friction formed between the contact surface 136 of the bar 142 and the outer surface 74 of the bale 26. For example, the bar 142 may include knurling, ridges, or other textures formed into or on the bar 142 to increase the amount of friction formed between the bale 26 and the bar 142. Still further, the bar 142 may be formed with a square, triangular, or other polygonal cross-section. In still other implementations, the cross-bar 142 may be rotationally coupled to the legs 162, allowing the bar 142 to rotate when coming into contact with the bale 26. In such an implementation, the friction between the outer surface 74 of the bale 26 and the contact surface 136 of the arm 134 can be substantially decreased, or nearly eliminated. As such, dissipating forces against the bale 26 can be limited nearly exclusively to the pivoting of the arm 134 with respect to the base 130. In still further implementations, the rotation of the cross-bar 142 with respect to the legs 162 may be damped independently of the motion of the legs 162 with respect to the base 130. In such implementations, the rotational characteristics of the cross-bar 142 may be adjusted so as to minimize any damage being caused to the outer surface 74 of the bale 26 while still providing some supplemental stopping force (i.e., friction) to the bale 26.

Each of the one or more resistance members 138 of the damper assembly 90 extends between and is coupled to both the base 130 and the arm 134 to resist movement therebetween. In the illustrated implementation, each resistance member 138 includes a gas shock; however in alternative implementations, the resistance member 138 may include a viscous damper, a hydraulic cylinder, an air spring, a mechanical spring, an electronic actuator, a brake assembly (e.g., a disk or drum brake), and other forms of motion control devices. Furthermore, although the illustrated implementation includes two resistance members 138 each attached to a respective one of the legs 162 of the arm 134, a single damper or any other number of dampers may instead be used as necessary to produce the desired amount of damping force, and can be coupled to the arm 134 or to any other location of the cross-bar 142. Although not shown, each resistance member 138 may also be adjustable, either manually or automatically, to accommodate bales 26 of different sizes, different bale movement speeds, and bale weights. More specifically, a larger damping force may be provided in instances where larger or heavier bales 26 are being produced, while, a lower damping force may be provided when smaller or lighter bales 26 are created. In still other implementations, the resistance member 138 may only resist the motion of the arm 134 in a single direction, permitting the arm 134 to move unopposed in an opposite direction. Still further, the resistance member 138 may be "locked out" causing the arm 134 to become fixed in place with respect to the base 130. In still other implementations, the resistance member 138 may be adjustable between an off configuration (i.e., the resistance member 138 provides no resistance) and an on configuration (i.e., the resistance member 138 provides resistance). In such implementations, changing the resistance member 138 from the off configuration to the on configuration may cause the resistance member 148 to bias the arm 134 to the first position.

In instances where a gas shock or fluid damper are used, a pin or block may be used to limit the length of retraction of the resistance member 138 (i.e., how close the first end can retract toward the second end of the device). In the illustrated implementation, the resistance member 138 is passive in nature, however in alternative implementations the resistance member 138 may be actively controlled by a controller (not shown). In such implementations, the controller may control the resistance member 138 based on one or more inputs such as, but not limited to, the motion of the bale 26, contact between the bale and the damper assembly 90, force sensor readings, and the like. Still further, the controller may include one or more pre-programmed algorithms that automatically run once a trigger has been activated. For example, the resistance member 138 may cause the arm 134 to retract toward the second position at a predetermined rate once the arm 134 comes into contact with the bale 26. In such implementations, the resistance member 138 may include a hydraulic cylinder driven by a series of hydraulic valves and pumps (not shown), or an electrical actuator or combination of both.

Still further, the resistance member 138 may be in operable communication with the baler 18. For example, in some implementations the baler 18 may include one or more valves re-directing hydraulic fluid to the resistance member 138 based at least in part on the position of the rear door 50 when the resistance member 138 is a hydraulic cylinder. In other implementations, the baler 18 may include electrical leads to provide electrical power to the resistance member 138 when the resistance member 138 is an electric actuator.

Figure 15:
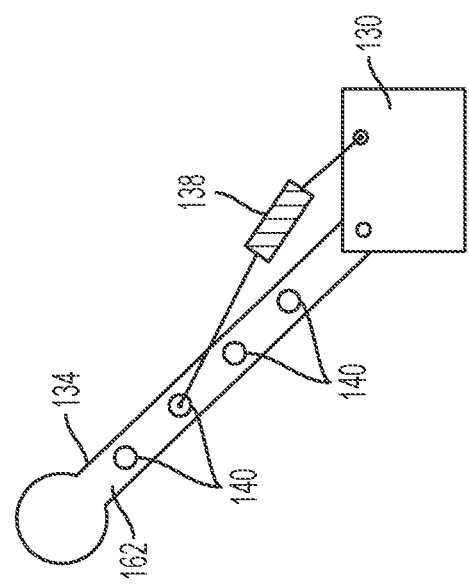
FIG. 15 is a schematic view of another implementation of the damper assembly.

In still other implementations, the damping forces provided by the resistance members 138 may be adjusted by altering the mounting locations of the resistance member 138 with respect to the arm 134 and base 130 (see FIG. 15). More specifically, each leg 162 of the arm 134 may include a plurality of mounting apertures 140 therein. During use, the user may adjust the damping force provided by the resistance member 138 by securing one end of the resistance member 138 to a respective one of the mounting apertures 140 such as with a pin and the like (not shown). By doing so, the user changes the geometric orientation between the arm 134, base 130 and resistance member 138 such that a single resistance member 138 will provide different levels of damping force over the same range of motion between the arm 134 and the base 130. In still other implementations, apertures may be formed along the length of the resistance member 138 (not shown). In still other implementations, one or more of the mounting points may be adjustable on the resistance member 138, for example, the ends may be threadably coupled to the resistance member 138 so that the relative positions of the two ends of the resistance member 138 may be adjusted.

The damper assembly 90 may also include one or more springs 166, extending between and coupled to both the arm 134 and the base 130, or between the cross-bar 142 and the base 130. The springs 166 may also provide supplemental damping forces to the resistance members 138 when necessary. Still further, the spring 166 may also be used to return the damper assembly 90 to the rest position (described below).

Figure 12:
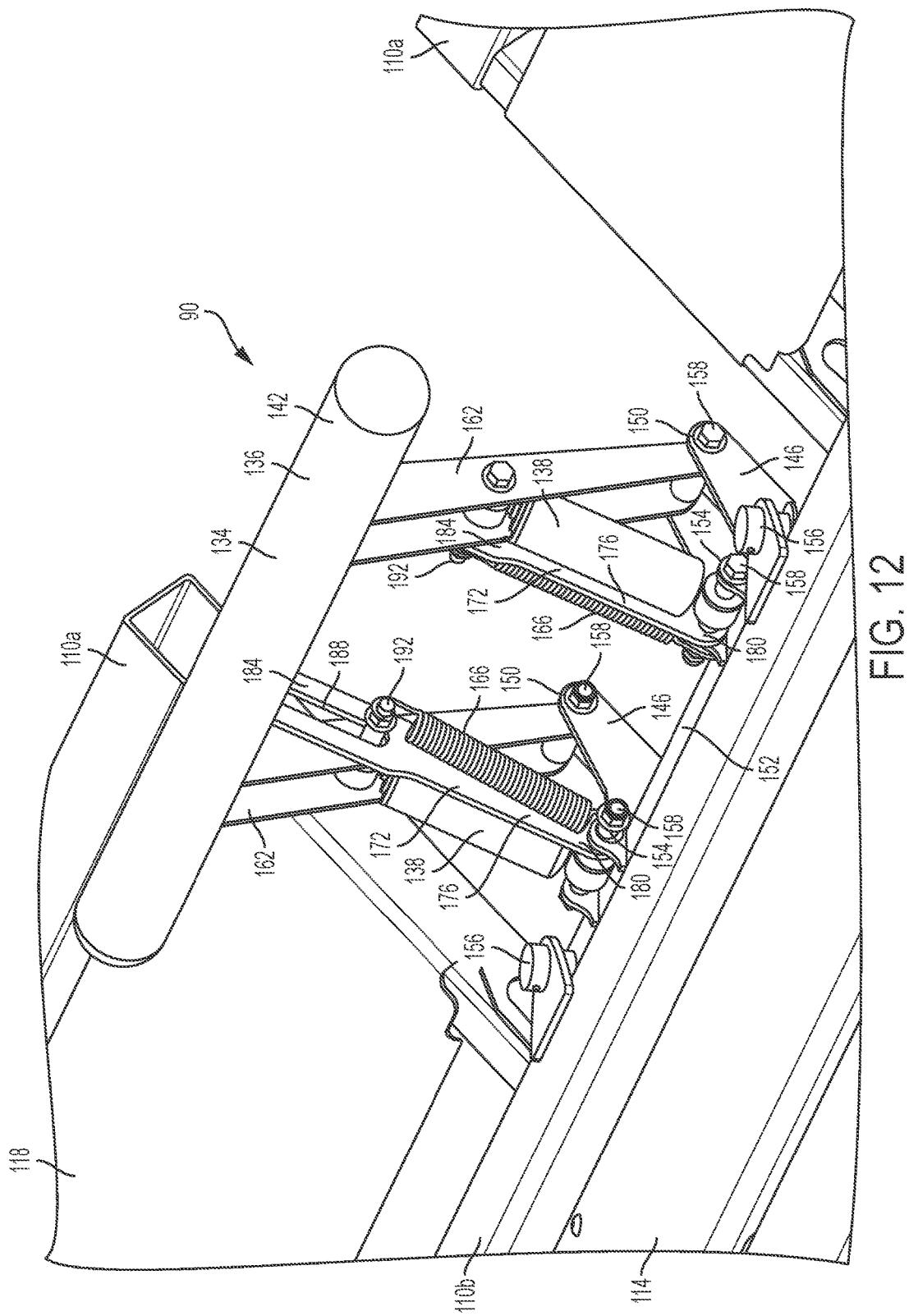
FIG. 12 is a detailed perspective view of the damper assembly of the accumulator of FIG. 4 with hard stops installed thereon.

Illustrated in FIG. 12, on implementation of the damper assembly 90 includes a pair of hard stops 172 configured to limit the travel of the arm 134 with respect to the base 130. In the illustrated construction, each hard stop 172 includes an elongated body 176 having a first end 180 pivotably coupled to the base 130, and a second end 184 opposite the first end 180 that is coupled to the arm 134. In particular, the second end 184 of the body 176 includes an elongated slot 188 coupled to the arm 134 by a pin 192. During use, the pin 192 travels along the length of the slot 188 as the arm 134 pivots with respect to the base 130 restricting the pivoting of the arm 134 each time the pin 192 reaches an end of the slot 188. More specifically, each end of the slot 188 substantially corresponds with the first position and the second position of the arm 134 (described below). As such, the hard stops 172 may be used to set and adjust the first position and the second position of the arm 134 during operation. In one implementation, the slot 188 is sized such that the cross-bar 142 cannot pass beyond alignment with rail 110*a* of the trough 82. As such, the cross-bar 142 creates a shingle effect with the rail 110*a* to ensure that the bale 26 slides smoothly along the length of the trough 82 when the shuttle assembly 86 slides the bale 26 from the central bay 102*b* to one of the adjacent bays 102*a*, 102*c*. In alternative implementations, the hard stop 172 may be integrally formed with the resistance member 138. In still other implementations, the hard stop 172 may be adjustable so that the user may adjust the travel limits of the arm 134.

In still other implementations, the hard stops 172 and the mounting locations of the resistance members 138 may be adjusted in combination to provide still further variations and adjustability to the damping forces applied by the damping assembly 90 to the bale. More specifically, the hard stops 172 and the mounting locations of the resistance member 138 may be adjusted to "pre-load" the springs 166 or the resistance member 138 by setting the first position of the hard stop 172 at a location different than the natural resting point of the resistance member 138.

During operation, the arm 134 and the cross-bar 142 of the damper assembly 90 pivots with respect to the trough 82, or more broadly with respect to the frame 78 of the accumulator 22. In the illustrated implementation by way of example, the arm 134 of the damper assembly 90 pivots between a first or rest position (FIGS. 4-5), where the cross-bar 142 of the arm 134 is not aligned with the side wall 118 of the trough 82, and a second or engaged position (FIGS. 6-7), where the cross-bar 142 of the arm 134 is substantially aligned with and positioned slightly above the side wall 118 of the trough 82. More specifically, the arm 134 is biased toward the first position by the springs 166 and is configured to engage the bale 26 as it enters the trough 82 via the loading zone 170 and in the insertion direction 98. Once engaged by the bale 26, the resistance members 138 are configured to resist motion of the arm 134 with respect to the base 130, thereby providing a damping force against the motion of the bale 26. In the illustrated implementation, the arm 134 generally forms an angle between approximately 10 degrees and approximately 80 degrees with respect to the bottom 114 of the trough 82 when in the first position. In other implementations, the arm 134 generally forms an angle between approximately 30 and 50 degrees with respect to the bottom 114 of the trough 82 when in the first position. In still other implementations, the arm 134 forms an angle of approximately 45 degrees angle with respect to bottom 114 of the trough 82 when in the first position. In still other implementations, the arm 134 generally forms an angle of 85 degrees with respect to the bottom 114 of the trough 82. Stated differently, the cross-bar 142 of the arm 134 is positioned between approximately 1 foot and approximately 3 feet above the bottom 114 of the trough 82 when the arm 134 is in the first position.

While the arm 134 of the illustrated implementation is pivotably coupled to the frame 78 for rotational movement with respect thereto; in alternative implementations, the arm 134 may be mounted in ways that allow for alternative forms of motion during use. In some implementations, the arm 134 may be mounted for linear motion with respect to the frame 78 (e.g., mounted on rails, further described below). In still other implementations, the arm 134 may be mounted to the frame 78 such that is moves in a combination of linear and curvilinear motions (e.g., mounted with a four-bar linkage, move along curvilinear slots, and the like, not shown).

In still other implementations, the arm of the damper assembly 90 may include a pair of arms 134a, 134b pivoting about an axis extending substantially normal to the base 114 of the trough 82 (see FIGS. 16a, 16b). In such implementations, each arm 134a, 134b may be independently rotatable with respect to the trough 82 and include a dedicated damper (not shown). In still other implementations, the movement of the arms 134a, 134b may be related by linkages, gears, and the like (not shown). In still other implementations, the damper assembly 90 may include only a single arm 134 rotating about an axis extending substantially normal to the base 114 (see FIG. 16c).

The illustrated damper assembly 90 is generally axially aligned with the location in which the bale 26 is to be introduced into the device (e.g., the loading zone 170) such that when the bale 26 is introduced via the insertion direction 98, the bale 26 will come into contact with the damper assembly 90 as it rolls into position within the trough 82 (FIG. 3). In the illustrated implementation, the damper assembly 90 is positioned within the center storage bay 102b of the trough 82. As such, when the accumulator 22 is installed on the baler 18, a bale 26 exiting the rear aperture 54 of the baler 18 will contact the damper assembly 90 as it rolls into the position within the trough 82.

To load a bale onto the accumulator 22, the user first introduces a bale 26 into the loading zone 170 of the trough 82 in the insertion direction 98. While being loaded, the bale 26 is oriented such that the bale's axis 66 is substantially parallel to the central axis 94 of the accumulator so that the bale 26 will rotate or roll about its outer surface 74 toward the trough 82 in the insertion direction 98. In the illustrated implementation, the bale 26 is introduced into the trough 82 in the insertion direction 98 by exiting the rear aperture 54 of the baler 18; however in alternative constructions, the bale 26 may be introduced into the accumulator by any form of loading device known in the art. The bale 26 then rolls toward the volume 106 of the trough 82 (FIG. 8a). As the bale 26 begins to enter the trough 82, the bale 26 has an initial value of kinetic energy.

Figure 8B:
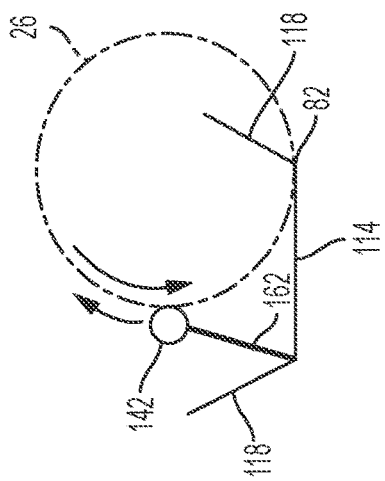
FIGS. 8a-8d are schematic views of a bale being loaded into an accumulator.
Figure 8D:
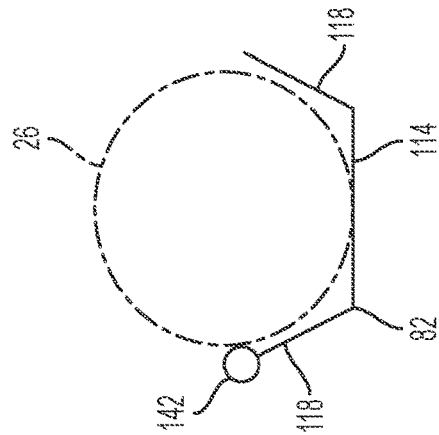
Figure 8A:
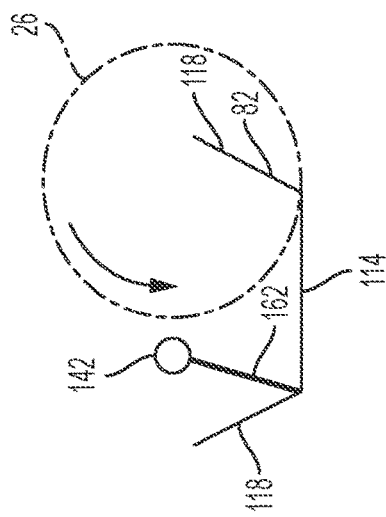

After entering the volume 106, the bale 26 continues to travel in the insertion direction 98 until the outer surface 74 of the bale 26 comes into contact with the cross-bar 142 of the arm 134 (FIG. 8b). Once in contact, the frictional force created between the cross-bar 142 and the outer surface 74 of the bale 26 creates a torque, acting against the rotation of the bale 26 about the bale's axis 66—thereby dissipating at least a portion of the bale's rotational energy. As the contact force between the cross-bar 142 and the bale 26 increases, the frictional force and torque acting against the rotation of the bale 26 also increases. In alternative implementations where a rotationally mounted or low-friction cross-bar 142 is utilized, little to no rotational energy may be dissipated at this initial phase.

As the bale 26 continues to travel into the volume 106 of the trough 82, the bale 26 begins to bias the arm 134 from the first position toward the second position. As the arm 134 rotates with respect to the base 130, the one or more resistance members 138 provide resisting forces to the arm 134, which are in turn applied through the arm 134 to the bale 26 itself. (FIG. 8c) These forces act to dissipate at least a portion of both the kinetic and rotational energies of the bale 26.

As the arm 134 approaches the second position, the kinetic energy of the bale 26 is almost completely dissipated, such that once the bale 26 reaches its rest position (FIG. 8d), very little to no recoil oscillations occur. With the bale 26 resting in the trough 82, it is ready to be subsequently processed (i.e., moved axially to an adjacent cell 102a, 102c by the shuttle assembly 86; described above).

Figure 8C:
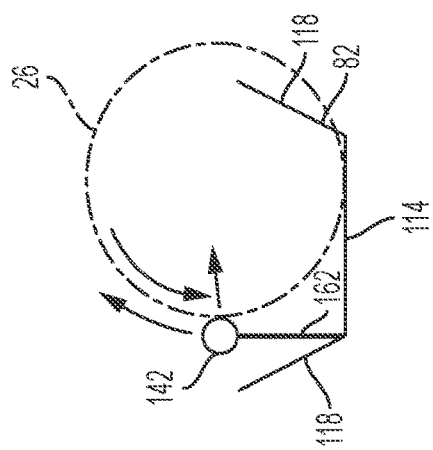

By utilizing resistance members 138 to controllably decelerate the bale 26 as it enters the trough 82, the damper assembly 90 is able to increase the speed at which the bale 26 can be loaded without sacrificing the time the bale 26 takes to come to rest (i.e., recoil oscillations) or requiring a reinforced frame to accommodate increased forces. As described, during operation of the device 22, damper assembly 90 may dissipate the kinetic energy of the bale 26 in any combination of two primary ways: first, the frictional force of the outer surface 74 of the bale 26 contacting the cross-bar 142 produces a torque acting counter to the rotational motion of the bale 26 (FIG. 8b); and second, the resistance member 138 resists the pivoting motion of the arm 134 and creates a dissipating, resistive force against the motion of the bale 26 itself (FIG. 8c). Together, these two forces dissipate the energy of the bale 26 quickly and in a controlled manner so as to damp the motion of the bale 26 within the trough 82.

Figure 13:
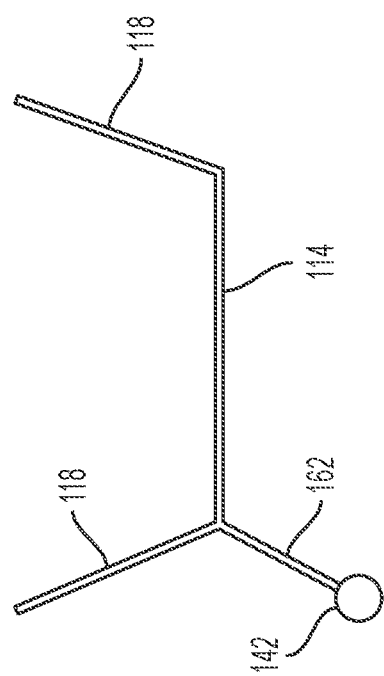
FIG. 13 is a schematic view of the accumulator with the damper assembly in a step position.
Figure 14:
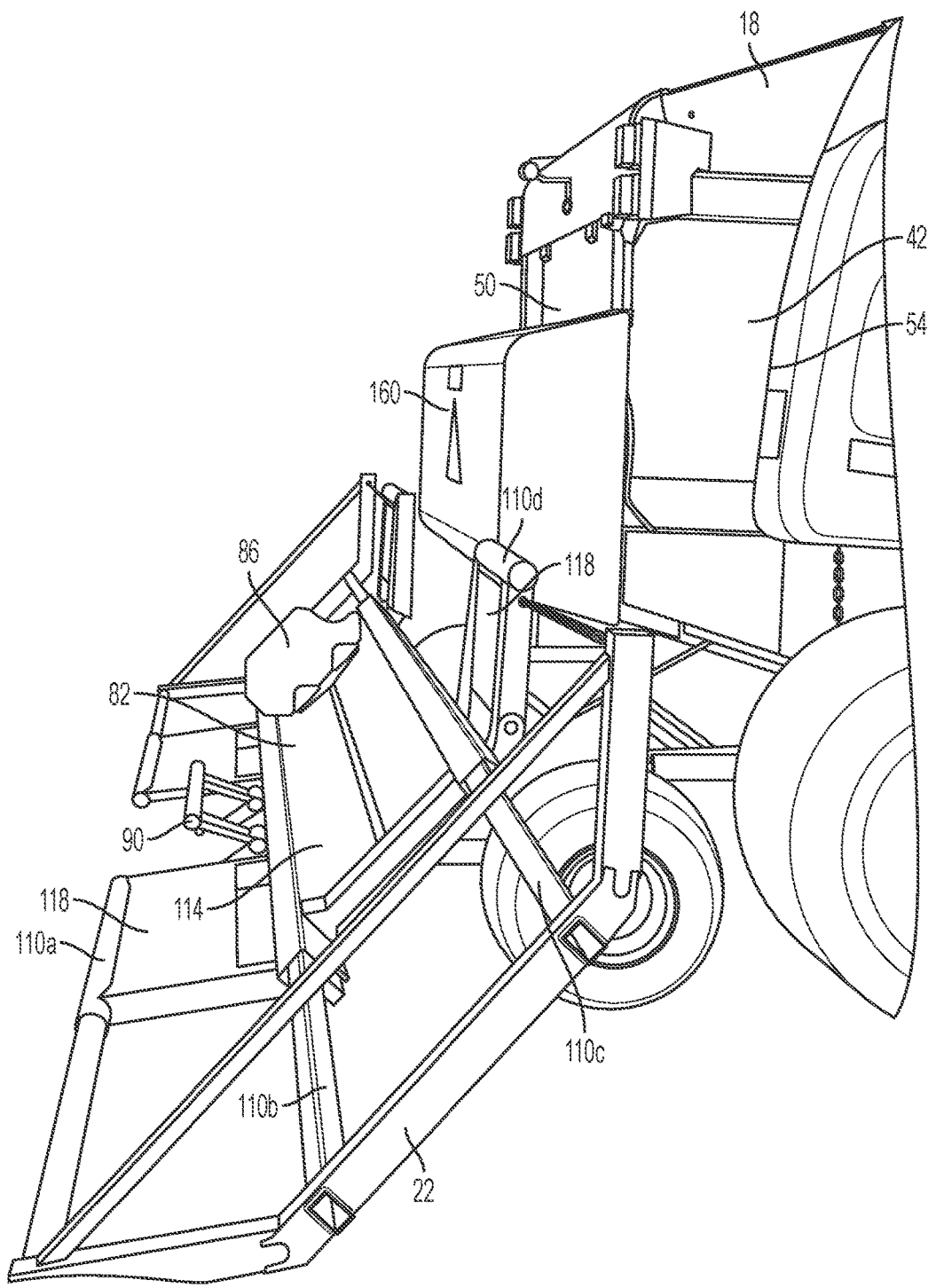
FIG. 14 is a rear perspective view of the accumulator of FIG. 1 with the accumulator in a pass-through orientation.

In alternative implementations, the damper assembly 90 may also be utilized as a step to provide easier access to the trough 82 and baler 18. To utilize the damper assembly 90 as a step, the user first disengages the resistance members 138 by decoupling one end of the resistance members 138 from either the arm 134 or the base 130. The user may then pivot the arm 134 into the step position (see FIG. 13). Once in position, the user may lock the arm 134 in place with a locking mechanism (not shown), utilizing the cross-bar 142 as the step surface. In alternative implementations, the resistance members 138 may remain coupled to both the arm 134 and the base 130. In still other implementations Illustrated in FIG. 14, the damper assembly 90 may also be utilized when the accumulator 22 is in a pass-through mode of operation. More specifically, during the pass-through mode of operation, the trough 82 of the accumulator 22 is positioned at an angle with respect to horizontal (see FIG. 14) such that the trough 82 acts as an inclined ramp causing any bale 26 being ejected from the baler 18 to roll under the force of gravity across the bottom 114 of the trough and onto the support surface 38. The damper assembly 90 is configured such that, even with the trough 82 in the angled orientation, the damper assembly 90 remains in the necessary position to damp the motion of the bale 26 as it rolls across the bottom 114 of the trough 82 and onto the support surface 38. As such, the damper assembly 90 reduces the speed at which the bale 26 exits the trough 82 and reduces the distance the bale 26 will roll along the support surface 38.

While the present implementation of the bale storage system is discussed with regards to round bales, it is to be recognized that the damping system 90 may also be utilized with regards to the control and handling of rectangular bales as well.

Figure 9:
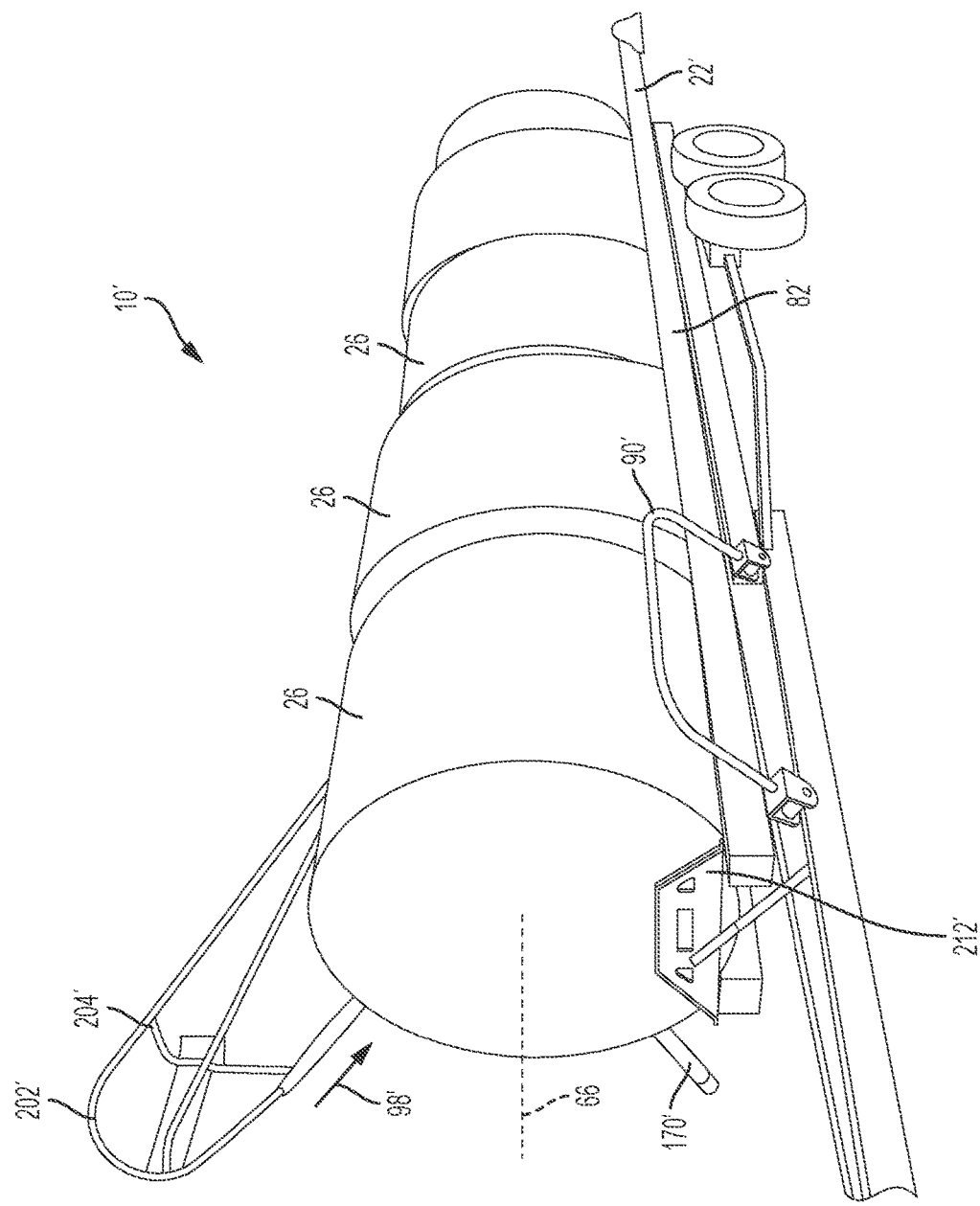
FIG. 9 is an alternative implementation of a bale collector system.

FIG. 9 illustrates an alternative implementation of a bale collection system 10'. The bale collection system 10' includes a bale trailer 200', as is well known in the art, having a damping system 90' according to the present disclosure installed thereon. Similar to the accumulator 22, the trailer 200' defines a trough 82' into which one or more round bales 26 can be positioned and stored. The trailer 200' also includes a loading assembly 202' configured to collect and introduce a bale 26 into the trough 82'. In the illustrated implementation, the loading assembly 202' includes a loading arm 204' that grasps a bale 26 from the ground 38' and introduces it, via the load zone 170' and in the introduction direction 98', into the trough 82'. In still other implementations, the loading assembly 202' may be configured to collect a bale 26 from a separate baler (not illustrated). Similar to that described above, the trailer 200' includes a damping system 90' axially aligned with the loading zone 170' and positioned opposite the introduction direction 98'. The damping system 90' of the trailer 200' acts in substantially the same manner as that utilized in the accumulator 22, dissipating the kinetic energy of the bale 26 as it rolls into the trough 82' for subsequent processing.

The loading assembly 202' of the illustrated implementation loads the bales 26 proximate the front 212' of the trailer 200'. In alternative implementations, the loading assembly 202' may move along the length of the trough 82' to load bales 26 next to one another. In such implementations, the damping system 90' is configured to move together with the load assembly 202' so that the damping system 90' remains axially aligned with the loading zone 170', regardless of its position relative to the trough 82'.

FIGS. 10a-11 illustrate yet another alternative implementation of the bale collection system 10". The bale collection system 10" includes a double bale trailer 200", as is well known in the art, having a damping system 90" accordingly to the present disclosure installed thereon. The double trailer 200" includes a pair of troughs 82a", 82b" each extending substantially parallel to one another and spaced a distance apart. The double trailer 22" also includes a pair of loading assemblies 202a", 202b", each corresponding to a respective one of the troughs 82a", 82b" (FIG. 11). The double trailer 200" also includes a damping system 90" operating substantially similarly to the damping system 90 described above. The primary difference between the damping system 90" and the damping system 90 is that the single arm 134" is able to rotate in both directions (A and B) to accommodate a bale 26 loaded from either loading assembly 202a", 202b". More specifically, the arm 134" will rotate in a first direction A (while applying damping forces to the bale 26) away from the first loading assembly 202a" to accommodate a bale 26 loaded in the first direction 98a", while the arm 134" will rotate in a second direction B (while applying damping force to the bale 26) away from the second loading assembly 202b" to accommodate a bale 26 loaded in the second direction 98b" In such a implementation, the arm 134" may include two pairs of dampers (not shown), each of which apply the necessary damping forces when the arm 134" moves in a particular direction. Furthermore, the arm 134" may include a single set of dampers (not shown) that is biased toward a neutral position, having available travel in both directions so as to compensate and apply damping forces whether the arm 134" travels in either direction. In still other implementations, the arm 134" may include two arms (not shown), each positioned to accommodate a bale 26 loaded from a respective loading assembly 202a", 202b".

Figure 17:
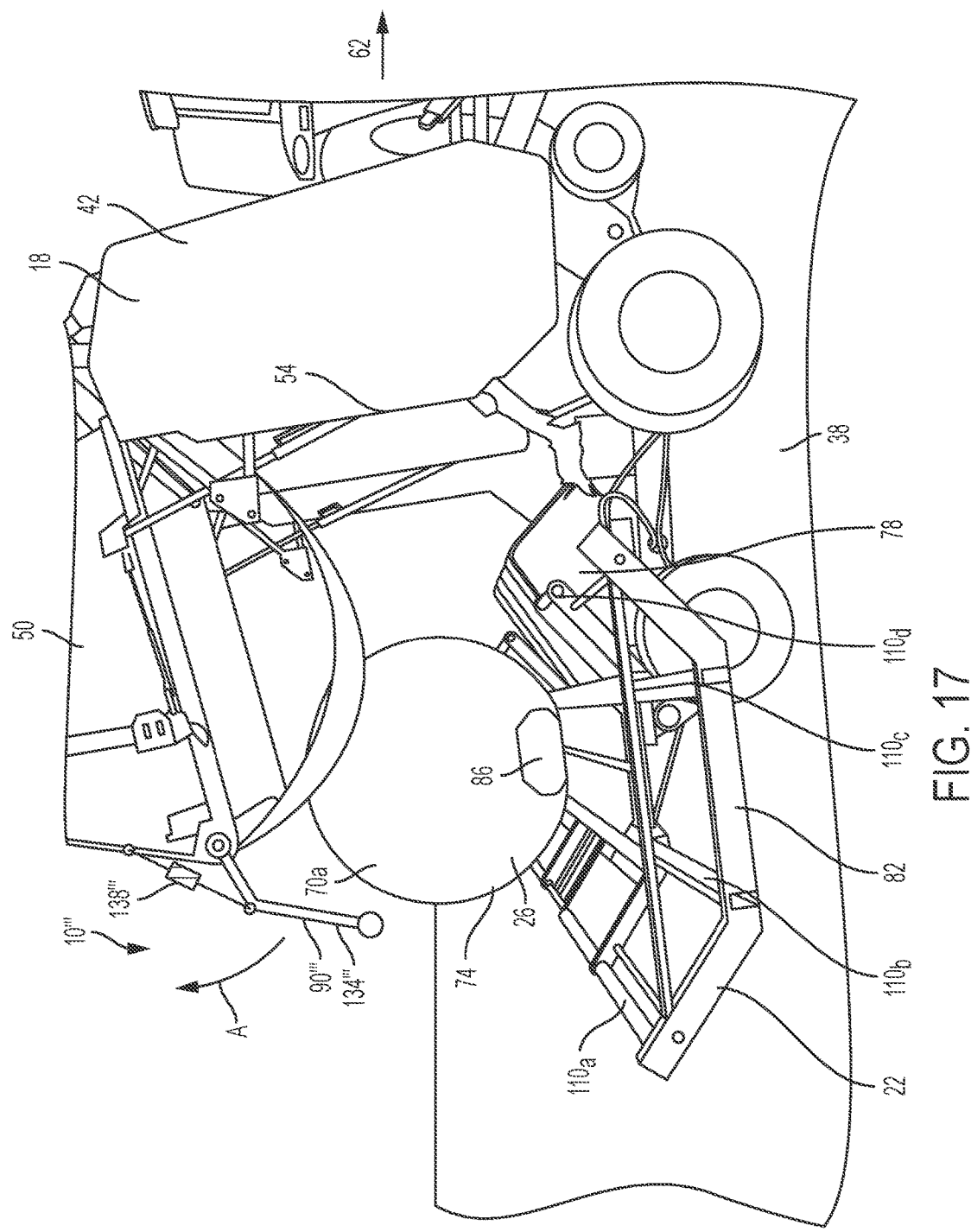
FIG. 17 is a perspective view of another implementation of the damper assembly.

FIG. 17 illustrates yet another alternative implementation of the bale collection system 10'". The bale collection system 10'" includes a damper assembly 90'" that is coupled to the crop package barrier 50 of the baler 18. In such an implementation, after a bale 26 has been formed, the crop package barrier 50 opens to allow the bale 26 to be ejected toward the accumulator 22. With the crop package barrier 50 opened, the damper assembly 90'" is positioned such that it contacts the bale 26 as it exits the baler 18, causing it to pivot in a first direction (A). As described above, the motion of the arm 134'" is resisted by the damper 138'", which absorbs at least a portion of the kinetic energy of the bale 26. As shown in FIG. 17, the damper assembly 90'" may be coupled to the crop package barrier 50 opposite the pivot joint so that the arm 134'" is in position to contact the bale 26 when the crop package barrier 50 is in an open position and the bale 26 exits the rear aperture 54 of the baler 18.

Figure 18B:
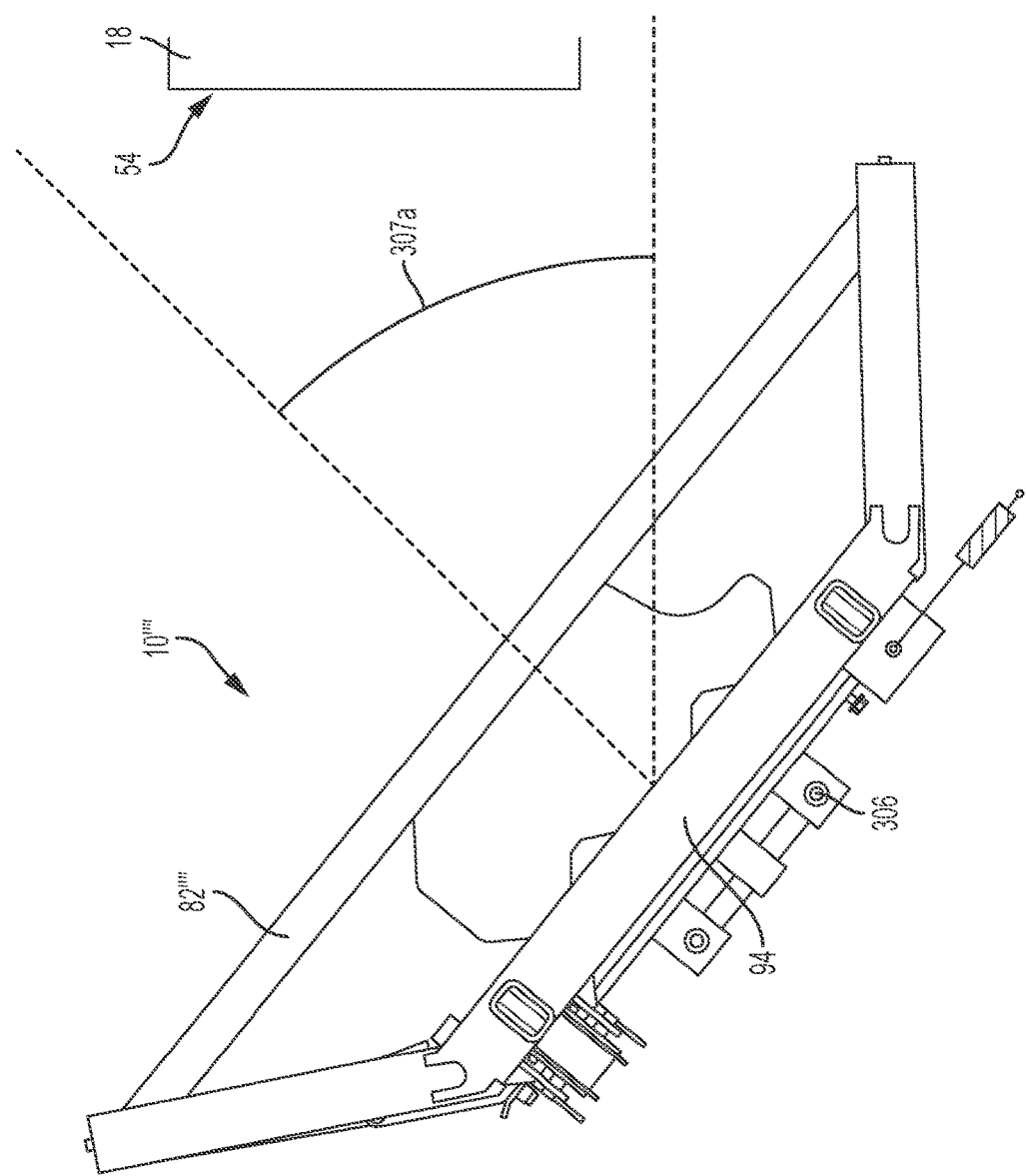
Figure 18C:
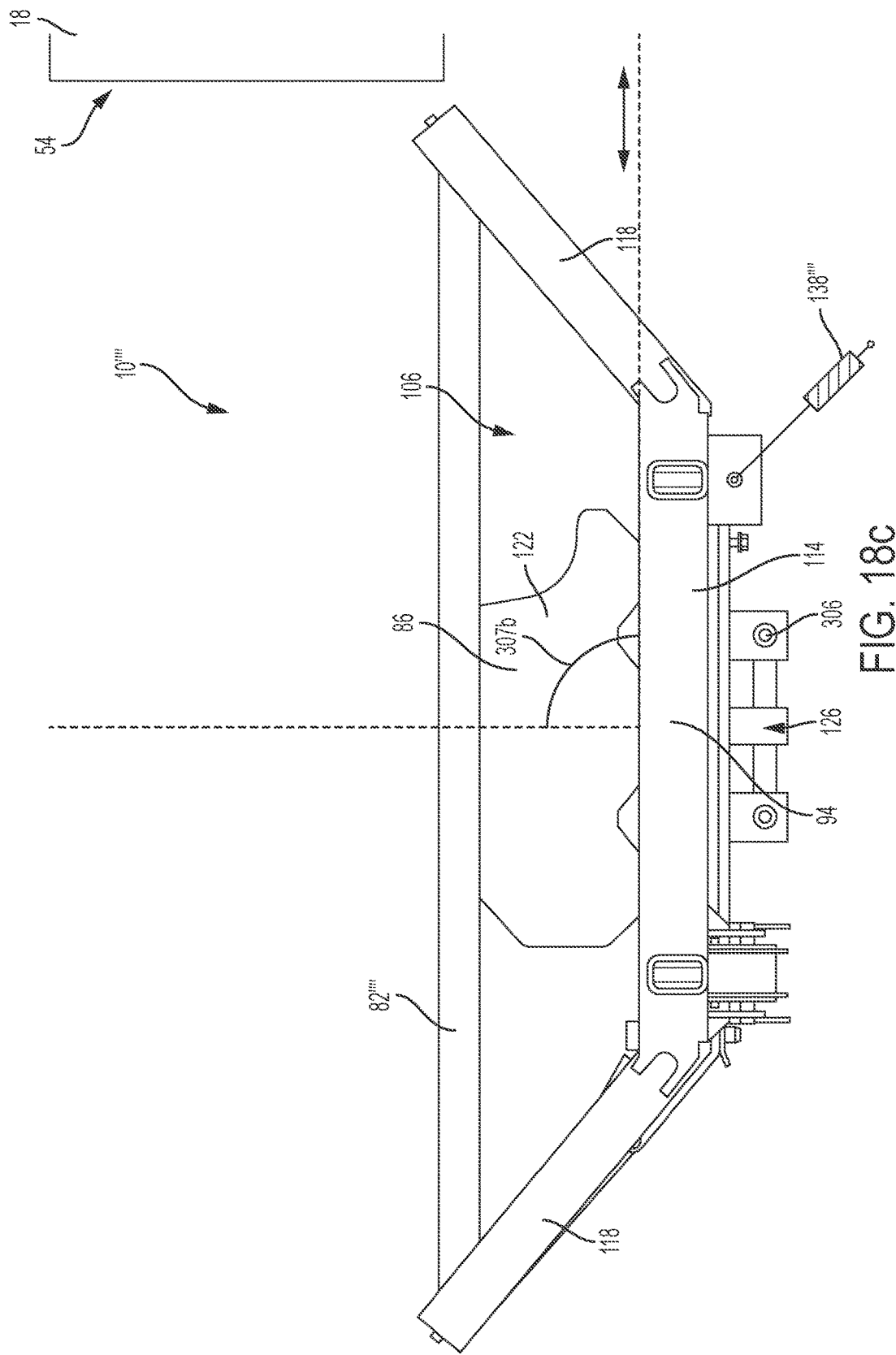
FIG. 18c illustrates a side view of another implementation of the accumulator of the bale system.

FIGS. 18A-18C illustrate yet another alternative implementation of the bale collection system 10"". The bale collection system 10"" includes a trough 82"" defining a storage bay sized to support at least a portion of a bale therein. The trough 82"" is movably mounted to the baler 18 and adjustable with respect to the rear aperture 54 of the baler 18 between a first position, where the trough 82"" is at rest and no bale is positioned within the storage bay, and a second position, where at least a portion of a bale 26 is positioned within the storage bay of the trough 82"" and approximately all the kinetic energy of the bale has been dissipated. The bale collection system 10"" also includes a resistance member 138"" that is operably coupled to the trough 82"" and at least partially controls the motion of the trough 82"" as it moves between the first and second positions, as described above. In other implementations, the resistance member 138"" damps the motion of the trough 82"" between the first and second positions.

As shown in FIG. 18A, in one implementation the trough 82"" is movable translationally between the first position, where the trough 82"" is a first distance from the rear aperture 54 of the baler 18, and a second position, where the trough 82"" is positioned a second distance, greater than the first distance, from the rear aperture 54 of the baler 18. In some implementations, the trough 82"" may move linearly with respect to the baler 18, in a path that is substantially parallel to the support surface. In still other implementations, the trough 82"" may move with respect to the baler 18 along a curvilinear path, along rails, or via a four-bar linkage. In still other implementations, the movement of the trough 82"" may be a combination of both translational and rotational movement. During use, the motion of trough 82"" with respect to the baler 18 and the damping force provided by the resistance member 138"" causes the trough 82"" to dissipate at least a portion of the kinetic energy of the bale 26 as it exits the rear aperture 54.

As shown in FIGS. 18B and 18C, in still other implementations the bale collection system 10"" may rotate between the first position and the second position about an axis of rotation 306 that is substantially parallel with the axis 94"" of the trough 82"". More specifically, the trough 82"" may rotate between a first position (FIG. 18B), where the trough 82"" forms a first trough angle 307a, and a second position (FIG. 18C), where the trough forms a second angle 307b that is different than first angle 307a. For the purposes of this application, the trough angle 307 is defined as the angle of a first ray extending substantially normal to the bottom surface of the trough 82"" and a second ray extending from the origin of the first ray and toward the front of the baler 18 substantially parallel to the baler's longitudinal axis.

In the illustrated implementation, the trough 82"" is angled toward the rear aperture 54 in the first position (i.e., the trough angle 307a is less than 90 degrees) and rotates away from the rear aperture 54 toward the second position (i.e., the trough angle 307 increases). Furthermore, the trough angle 307b is approximately 90 degrees when the trough 82"" is in the second position. During use, the rotational motion of the trough 82"" with respect to the baler 18 and the damping force provided by the resistance member 138"" causes the trough 82"" to dissipate at least a portion of the kinetic energy of the bale 26 as it exits the rear aperture 54.

In still other implementations, the trough 82"" may pivot with respect to the baler 18 between a first position, where the trough 82"" is angled to and open toward the rear aperture 54 of the baler 18, and second position, where the trough 82"" is substantially parallel to the support surface to help absorb at least a portion of the rotational motion of the bale 26. In still other implementations, the trough 82"" may also be pivoted away from the rear aperture 54 beyond the second position (e.g., the trough angle 307 is greater than 90 degrees) into a third position (see FIG. 14) to allow any bales stored on the trough 82"" to be positioned on the support surface 38.

FIGS. 19a and 19b illustrate yet another alternative implementation of the bale collection system 10"". The bale collection system 10"" includes a trough 82"" that has a first portion 300"", and a second portion 304"" that is movable with respect to the first portion 300"". In the illustrated implementation, the first and second portions 300"", 304"" of the tough 82"" include substantially the same cross-sectional shape as described above. During use, the second portion 304"" of the trough 82"" is movable with respect to the first portion 300"" between a first position, where the first portion 300"" is not aligned with the second portion 304"" (see FIG. 19a), and a second position, where the first portion 300"" is substantially aligned with the second portion 304"" (FIG. 19b). The bale collection system 10"" also includes a resistance member (not shown) in operable communication with the second portion 304"" and configured to at least partially control the motion of the second portion 304"". In other implementations, the resistance member provides a damping force against the motion of the second portion 304"". The second portion 304"" of the tough 82"" is biased toward and rests in the first position.

During use, the user first introduces a bale 26 into the second portion 304"" of the trough 82"". While being loaded, the bale 26 is oriented such that the bale 26 will rotate or roll about its outer surface 74 into the second portion 304"". In the illustrated implementation, the bale 26 is introduced into the trough 82"" after exiting the rear aperture 54 of the baler 18; however in alternative constructions, the bale 26 may be introduced into the accumulator by any form of loading device known in the art. The bale 26 then rolls into the second portion 304"" of the trough 82"". As the bale 26 enters the trough 82"", the bale 26 has an initial value of kinetic energy.

Once the bale 26 is positioned within the second portion 304"" of the trough 82"", the momentum of the bale 26 causes the second portion 304"" to begin to move with respect to the baler 18, either linearly or rotationally, from the first position and toward the second position. This motion, coupled with the resistive force provided by the resistance member 138"", helps dissipate at least a portion of the bale's kinetic energy.

The bale 26 and second portion 304"" continue to travel until the second portion 304"" enters the second position and is generally aligned with the first portion 300"" of the trough 82"". At this point, the kinetic energy of the bale 26 has been dissipated and the bale 26 is substantially stationary. With the bale 26 at rest and the second portion 304"" aligned with the first portion 300"" of the trough 82"", the bale 26 may then be processed as described above. More specifically, with the first portion 300"" generally aligned with the second portion 304"" the two portions become "shingled" allowing the bale to be transitioned axially along the axial length of the trough without damaging the bale 26 or its wrapping material.

While the illustrated implementation includes a first portion 300"" that is fixed relative to the rear aperture 54 of the bale 18, in alternative implementations the first portion 300"" may also be movable with respect to the rear aperture 54 either independently from or together with the second portion 304"".

Figure 20:
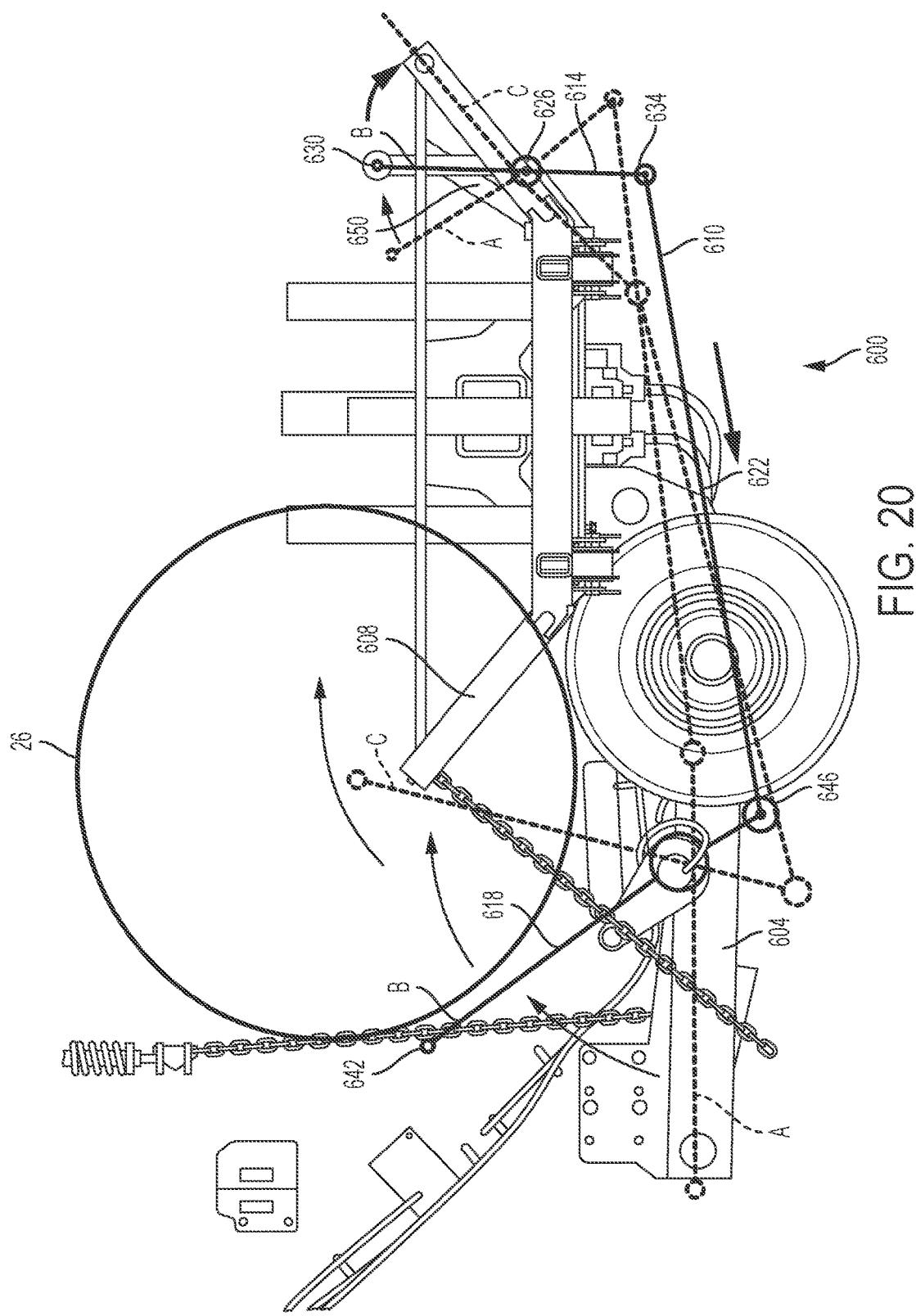
FIG. 20 illustrates a side view of another implementation of the accumulator of the bale system.

FIG. 20 illustrates yet another alternative implementation of the bale collection system 600. The bale collection system 600 includes a frame 604, a trough 608 coupled to the frame 604 and defining at least one storage bay sized to receive at least a portion of a bale 26 therein, and a multi-arm damper assembly 610 movable with respect to the trough 608. In the illustrated implementation, the damper assembly 610 includes a first member 614 movable with respect to the trough 608, and a second member 618 spaced a distance from the first member 614 and movable with respect to the trough 608. During use, the collection system 600 is configured to use both members 614, 618 to transfer a bale 26 from the baler 18 (i.e., the rear aperture 54 of the baler 18) to the storage bay defined by the trough 608. More specifically, the first member 614 and the second member 618 operate together to at least partially control the motion of the bale 26 as it moves between the baler 18 and the trough 608.

The first member 614 of the damper assembly 610 is pivotably coupled to the trough 608 at a first pivot point 626 positioned opposite the location where the bale 26 is introduced into the trough 608. The first member 614 includes a first end 630, configured to contact the bale 26 as it is introduced into the storage bay of the trough 608, and a second end 634 opposite the first end 630. While FIG. 20 illustrates the first member 614 being coupled to the trough 608, in alternative implementations the first member 614 may be coupled to the door 50 of the baler 18 (see FIG. 17, described above), the perimeter of the rear aperture 54 of the baler 18 or any other location where the first end 630 of the first member 614 is able to contact the bale 26 as it moves between the baler 18 and the storage bay. During use, the first member 614 is generally configured to contact the bale 26 as it enters the storage bay providing a resisting force against its rotation. Similar to the arm 138 described above, such a force may be used to dissipate the kinetic energy of the bale 26. Once the bale 26 is in its final rest position within the storage bay of the trough 608, the first member 614 is configured to restrict movement of the bale 26 (e.g., rotation about the bale axis 66) in a first direction.

The second member 618 of the damper assembly 610 is pivotably coupled to the frame 604 at a second pivot point 638 positioned between the trough 608 and the rear aperture 54 of the baler 18. The second member 618 includes a first end 642 configured to contact the bale 26, and a second end 646 opposite the first end 642. During use, the second member 618 is generally configured to contact the bale 26 and bias the bale 26 away from the rear aperture 54 of the baler 18 and toward the storage bay of the trough 608 while also restricting any motion back toward the rear aperture 54. Once the bale 26 is in its final rest position within the storage bay, the second member 618 is configured to restrict movement of the bale 26 (e.g., rotation about the bale axis 66) in a second direction, opposite the first direction.

The damper assembly 610 also includes a linkage member 622 coupled to and extending between both the first member 614 and the second member 618. In the illustrated implementation, the linkage member 622 is a substantially rigid rod configured to transmit motion and forces between the first member 614 and the second member 618 causing the motion of the two members 614, 618 to be interdependent. In alternative implementations, the linkage member 622 may include a spring, hydraulic cylinder, electric actuator, fluid damper, and the like allowing the user to vary the relative position of the first member 614 with respect to the second member 618 or to introduce elasticity into the assembly 610. In still other implementations, no linkage member 622 may be present and each member 614, 618 may be independently driven by one or more actuators (described below). In such implementations, the movement of the members 614, 618 may still be coordinated to control the movement of the bale 26 as desired.

The damper assembly 610 may also include an actuator 650 coupled to one of the first or second members 614, 618 and configured to control the motion of the system 600 between the first and second configurations (described below). During use, the motion of the first and second members 614, 618 may be at least partially determined based on one or more inputs received by one or more controllers (not shown). Such inputs my include, but are not limited to, the location and movement of the bale 26, elements coming into contact with the bale 26, and the like. Still further, the motion of the first and second members may include a pre-determined algorithm or path that is triggered by an event. In the illustrated implementation, a single actuator 650 directly controls the motion of the first member 614 which in turn dictates the motion of the second member 618 via the linkage member 622. In other implementations, each member 614, 618 may have its own actuator (not shown) allowing direct control of each member's 614, 618 movement independently.

The damper assembly 610 may also include a resistance member (not shown) in addition to or in replacement of the actuator 650. Similar to the resistance members 138 described above, the resistance member is configured to dissipate the kinetic energy of the baler 26 as it enters the trough 608. In still further implementations, the damper assembly 610 may not include a resistance member or actuator 650, rather relying on the layout and design of the members to capture the bale 26 in such a way that the bale's kinetic energy is dissipated without damaging the bale 26 or the damper assembly 610.

During use, the damper assembly 610 is adjustable between a first configuration (see position A in FIG. 20), where the damper assembly 610 is at rest and awaiting the introduction of a bale 26 into the trough 608, and a second configuration (see position C in FIG. 20) where the assembly 610 has transferred the bale 26 into the storage bay of the trough 608 and secured the bale 26 in place. In the illustrated implementation, the system 600 is configured to capture or otherwise secure the bale 26 within the trough 608 by restricting the movement of the bale 26 in both rotational directions. Stated differently, when the damper assembly 610 is in the second configuration, the damper assembly 610 is configured to resist the rotation energy of the bale 26 about its axis 66 in both directions of rotation. More specifically, the system 600 restricts rotation in one direction with the first end 630 of the first member 614 and restricts rotation in a second direction with the first end 642 of the second member 618.

In still another implementation, the damper assembly 610 may be configured such that the first member 614 includes the crop package barrier 50 of the baler 18. In such an implementation, the distal end of the door 50 (e.g., the end of the crop package barrier 50 opposite the hinge) generally acts as the first end 630 and is configured to contact the bale 26 as it exits the rear aperture 54 and at least partially control the movement of the bale 26 as it is transferred between the baler 18 and the storage bay of the trough 608. In still other implementations, the crop package barrier 50 may also include an arm 134 pivotably coupled thereto (see FIG. 17) such that the arm 134 acts as the first end 630.

What is claimed is:

1. A bale collection system for receiving and storing a bale introduced at a first location and in a first direction, the bale defining an axis therethrough, the bale collection system comprising:
    a frame defining at least one storage bay sized to store the bale therein;
    an arm movable between a first position and a second position different than the first position, the arm having a bale contact surface configured to contact a bale at least partially positioned within the storage bay; and
    a resistance member in operable engagement with the arm and configured to resist the motion of the arm toward the first and second positions.

2. The bale collection system of claim 1, wherein the arm is coupled to and moveable with respect to the frame.

3. The bale collection system of claim 1, wherein the frame defines a substantially concave cross-section.

4. The bale collection system of claim 1, further comprising a shuttle assembly configured to move the bale with respect to the frame.

5. The bale collection system of claim 1, further comprising a baler, and wherein the frame is coupled to the baler and configured to receive the bale from the baler at the first location and in the first direction.

6. The bale collection system of claim 1, wherein the arm includes a cross-bar and at least one leg extending generally perpendicular from the cross-bar, and wherein the cross-bar at least partially defines the bale contact surface.

7. The bale collection system of claim 6, wherein the cross-bar is fixed with respect to the at least one leg.

8. The bale collection system of claim 1, wherein the arm is coupled to the frame opposite the first location.

9. The bale collection system of claim 1, wherein the resistance member includes at least one of a gas shock, a viscous damper, a hydraulic cylinder, an electronic actuator, and a brake assembly.

10. The bale collection system of claim 1, wherein the resistance member is actively controlled by a controller.

11. The bale collection system of claim 1, wherein the arm moves from the first position toward the second position when the bale contacts the bale contact surface.

12. A bale collection system for receiving and storing a bale, the collection system comprising:
    a plurality of rail members defining a trough having a central axis therethrough, the central axis being generally parallel to each rail member of the plurality of rail members;
    a damping system coupled to at least one of the rail members and configured to engage the bale at least partially received within the trough, the damping system including:
    an arm movable with respect to the trough in a direction generally perpendicular to the central axis between a first position and a second position, and
    a resistance member coupled to the arm and configured to resist movement of the arm toward the first position and the second position.

13. The bale collection system of claim 12, wherein the trough is coupled to a baler having a rear aperture, and wherein the trough is positioned such that the bale ejected from the rear aperture is at least partially received within the trough.

14. The bale collection system of claim 12, wherein the arm includes a cross-bar configured to engage the bale, and at least one leg extending from the cross-bar.

15. The bale collection system of claim 12, further comprising a loading assembly configured to collect the bale and introduce the bale into the trough.

16. The bale collection system of claim 12, wherein the resistance member is adjustable to produce different damping forces.

17. An accumulator configured for coupling to a baler, the accumulator comprising:
 a frame defining a storage bay sized to receive at least a portion of a bale from the baler therein; and
 a damping system including
  a member coupled to and movable with respect to the frame between a first position and a second position, the member including a bale contact surface, wherein the member is configured to move with respect to the frame upon the introduction of at least a portion of the bale into the storage bay, and
  a resistance member operatively positioned between the member and the frame, the resistance member configured to resist the movement of the member toward both the first and second positions.

18. The accumulator of claim 17, wherein the frame includes a plurality of rails extending generally parallel to one another to at least partially define the storage bay.

19. The accumulator of claim 18, wherein the member is pivotable with respect to the frame about a pivot axis.

20. The accumulator of claim 19, wherein the frame defines a central axis parallel to the rails, and wherein the pivot axis is generally parallel to the central axis.

21. The accumulator of claim 17, wherein the resistance member is adjustable to produce different damping forces.

22. A bale collection system for receiving and storing a bale, the bale collection system comprising:
 a baler having a rear aperture through which the bale is ejected;
 a crop package barrier coupled to the baler proximate the rear aperture and movable with respect to the rear aperture between an open position and a closed position; and
 a dampening system coupled to the crop package barrier and including
  a member coupled to and movable with respect to the crop package barrier, the member including a bale contact surface, and wherein the member is configured to move with respect to the crop package barrier upon the ejection of a bale from the rear aperture, and
  a resistance member operatively coupled to the member and configured to resist the movement of the member with respect to the crop package barrier.

23. The bale collection system of claim 22, wherein the resistance member includes at least one of a gas shock, a viscous damper, a hydraulic cylinder, a spring, and a brake assembly.

24. The bale collection system of claim 22, wherein the resistance member is adjustable to produce different damping forces or no damping force.

* * * * *